(12) United States Patent
Mun et al.

(10) Patent No.: US 10,642,408 B2
(45) Date of Patent: May 5, 2020

(54) MOBILE TERMINAL HAVING AN UNDERWATER MODE

(71) Applicant: LG ELECTRONICS INC., Seoul (KR)

(72) Inventors: Sangik Mun, Seoul (KR); Younghwan Kim, Seoul (KR); Manho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 86 days.

(21) Appl. No.: 15/913,757

(22) Filed: Mar. 6, 2018

(65) Prior Publication Data

US 2018/0260070 A1    Sep. 13, 2018

(30) Foreign Application Priority Data

Mar. 7, 2017   (KR) .................. 10-2017-0028630

(51) Int. Cl.
| | |
|---|---|
| *G06F 3/041* | (2006.01) |
| *G06F 3/044* | (2006.01) |
| *G06F 3/0488* | (2013.01) |
| *G06F 3/01* | (2006.01) |
| *H04W 88/02* | (2009.01) |

(52) U.S. Cl.
CPC ............ *G06F 3/0416* (2013.01); *G06F 3/016* (2013.01); *G06F 3/044* (2013.01); *G06F 3/0418* (2013.01); *G06F 3/0488* (2013.01); *H04W 88/02* (2013.01); *G06F 2200/1633* (2013.01)

(58) Field of Classification Search
CPC ................................................... G06F 3/0416
USPC ......................................................... 345/174
See application file for complete search history.

(56) References Cited

U.S. PATENT DOCUMENTS

| | | | |
|---|---|---|---|
| 9,904,427 B1* | 2/2018 | Co .......................... G06F 3/044 |
| 2012/0146924 A1* | 6/2012 | Inoue .................... G06F 3/0418 |
| | | | 345/173 |
| 2012/0249470 A1 | 10/2012 | Sugiura et al. |
| 2015/0009173 A1 | 1/2015 | Rodzevski et al. |
| 2015/0062069 A1 | 3/2015 | Shin et al. |
| 2015/0277720 A1* | 10/2015 | Thorson .............. G06F 3/04847 |
| | | | 345/174 |
| 2016/0334935 A1* | 11/2016 | Jeon ...................... G06F 3/0416 |
| 2017/0213525 A1* | 7/2017 | Tamegai .................. G09G 5/10 |

FOREIGN PATENT DOCUMENTS

EP           3096210           11/2016

OTHER PUBLICATIONS

European Patent Office Application Serial No. 18160265.7, Search Report dated Jul. 4, 2018, 9 pages.

\* cited by examiner

*Primary Examiner* — Long D Pham
(74) *Attorney, Agent, or Firm* — Lee Hong Degerman Kang & Waimey

(57) ABSTRACT

A mobile terminal includes a display comprising a display panel and a touch panel; and a controller. The controller is configured to execute a first operation; determine an underwater mode in response to receiving of sequential input to a first region, a second region, and a third region, of the touch panel, wherein the second region includes the first region, and the third region includes the second region and the first region; and terminate the executing of the first operation after the determining of the underwater mode.

20 Claims, 47 Drawing Sheets

MOBILE TERMINAL HAVING AN UNDERWATER MODE

CROSS-REFERENCE TO RELATED APPLICATION

Pursuant to 35 U.S.C. § 119(a), this application claims the benefit of earlier filing date and right of priority to Korean Patent Application No. 10-2017-0028630, filed on Mar. 7, 2017, the contents of which are hereby incorporated by reference herein in its entirety.

BACKGROUND OF THE INVENTION

1. Field of the Invention

The present invention relates to a mobile terminal, and more particularly, to a mobile terminal capable of preventing malfunction when the mobile terminal is submerged in water.

2. Description of the Related Art

Mobile terminals are portable devices which have one or more functions, such as performing voice and video call communications, inputting and outputting information, storing data, and the like. As the mobile devices are diversified in function, the mobile terminals may support more complicated functions such as capturing images or image or video, reproducing music or video files, playing games, receiving broadcast signals, wireless Internet, transmitting and receiving messages, and the like, and has been embodied in the form of a comprehensive multimedia player. Various attempts have been made to implement complicated functions in such a multimedia player by means of hardware or software.

SUMMARY OF THE INVENTION

It is an aspect of the present invention to provide a mobile terminal capable of preventing malfunction when the mobile terminal is submerged in water.

It is another aspect of the present invention to provide a mobile terminal capable of performing an operation appropriate for an underwater state when the mobile terminal is submerged in water.

In one general aspect, there is provided a mobile terminal comprising a display including a display panel and a touch panel, and a controller, wherein in response to determination of entering an underwater mode in a state that a first region touch signal to a third region touch signal are sequentially received from the touch panel, the controller cancels an operation that has been performed based on the first region touch signal or the second region touch signal.

In another general aspect, there is provided a mobile terminal comprising a display including a display panel and a touch panel, and a controller, wherein in response to determination of entering an underwater mode in a state that a first region touch signal to a third region touch signal are sequentially received from the touch panel, the controller controls the mobile terminal to enter the underwater mode and display a home screen of the underwater mode.

In yet another general aspect, there is provided a mobile terminal comprising a display including a display panel and a touch panel, and a controller, wherein in response to determination of entering an underwater mode in a state that a first region touch signal to a third region touch signal are sequentially received from the touch panel, the controller increases a reference level for touch signals received from the touch panel.

DETAILED DESCRIPTION OF THE PREFERRED EMBODIMENTS

Hereinafter, embodiments of the present invention will be described in detail with reference to the accompanying drawings.

In the specification, a mobile terminal includes a portable phone, a smart phone, a notebook computer, a digital broadcast terminal, a personal digital assistant (PDA), a portable multimedia player (PMP), a camera, a navigation device, a tablet computer, an e-book terminal, and the like. Further, in the following description, the suffixes "module" and "unit" of elements are used herein for convenience of description and do not have any distinguishable meanings or functions. Thus, the suffixes "module" and "unit" can be used interchangeably.

Recently, in order to protect mobile terminals from water and dust, mobile terminals having waterproof and dustproof function have been released. However, there is a problem in that malfunction, such as ghost touch, occurs when these mobile terminals are submerged in water.

Accordingly, the present invention provides a method of preventing malfunction such as ghost touch.

Figure 1:
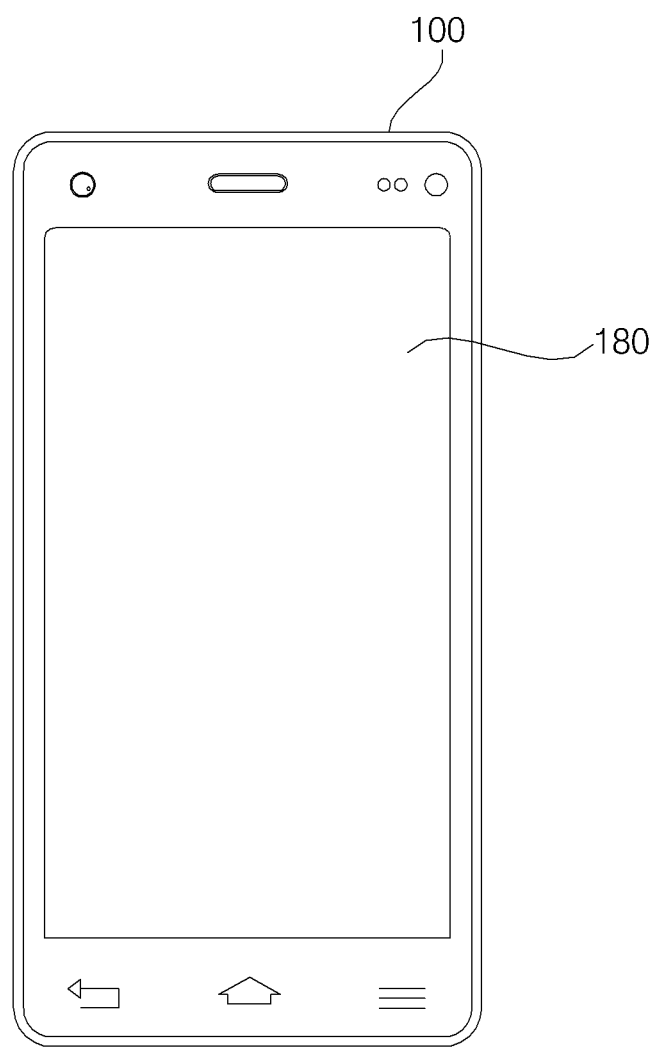
FIG. 1 is a diagram illustrating a mobile terminal according to an embodiment of the present invention.

FIG. 1 is a diagram illustrating a mobile terminal according to an exemplary embodiment of the present invention.

Referring to FIG. 1, the mobile terminal 100 according to an embodiment of the present invention comprises a display 180 including a display panel 182 (in FIG. 3) and a touch panel 184 (in FIG. 3), and a controller 170 (in FIG. 2), in which in response to determination of entering an underwater mode in a state that a first region touch signal to a third region touch signal being sequentially received from the touch panel 184 (in FIG. 3), the controller 170 (in FIG. 2) cancels an operation that has been performed based on the first region touch signal or the second signal touch signal. In this manner, in the case where the mobile terminal 100 is submerged in water, malfunction may be prevented.

Particularly, in the case where the third region, having an input of the third region touch signal, includes the first region and the second region, and the first region touch signal to the third region touch signal are sequentially received within a predetermined period of time, the controller 170 determines that the mobile terminal 100 is in an underwater mode. In this manner, determination of entering the underwater mode may be made accurately. As the mobile terminal 100 enters the underwater mode, the controller 170 may cancel an operation, which has been performed regardless of a user's intention, thereby enhancing user convenience.

Further, in response to the determination of entering the underwater mode, the controller 170 controls the mobile terminal 100 to enter the underwater mode and display a home screen of the underwater mode, such that the mobile terminal 100, in a state that being submerged in water, may perform an operation appropriate for the underwater state.

In addition, the mobile terminal 100 includes: a display 180 having a display panel 182 (in FIG. 3) and a touch panel 184 (in FIG. 3), and a controller 170 (in FIG. 2), in which in response to determination of entering an underwater mode in a state that a first region touch signal to a third region touch signal being sequentially received from the touch panel 184 (in FIG. 3), the controller 170 (in FIG. 2) controls the mobile terminal 100 to enter the underwater mode and display a home screen of the underwater mode. Accordingly, in the case where the mobile terminal 100 is submerged in water, the mobile terminal 100 may perform an operation appropriate for the underwater state.

Particularly, the controller 170 may control items displayed on the home screen of the underwater mode to be set differently from items displayed on a home screen before the underwater mode is initiated, such that an operation appropriate for the underwater state may be performed.

Further, in a state that the home screen of the underwater mode is displayed, brightness of the home screen of the underwater mode or the size of the items displayed on the home screen of the underwater mode may be greater than brightness of a home screen before the underwater mode or the size of the items displayed on the home screen before the underwater mode, such that an operation appropriate for the underwater state may be performed.

Moreover, in the case where a camera item is selected from among the items on the home screen of the underwater mode, a volume may be turned up in a state that a video is captured under water, thereby enabling filming appropriate for the underwater state, and thus enhancing user convenience.

Figure 2:
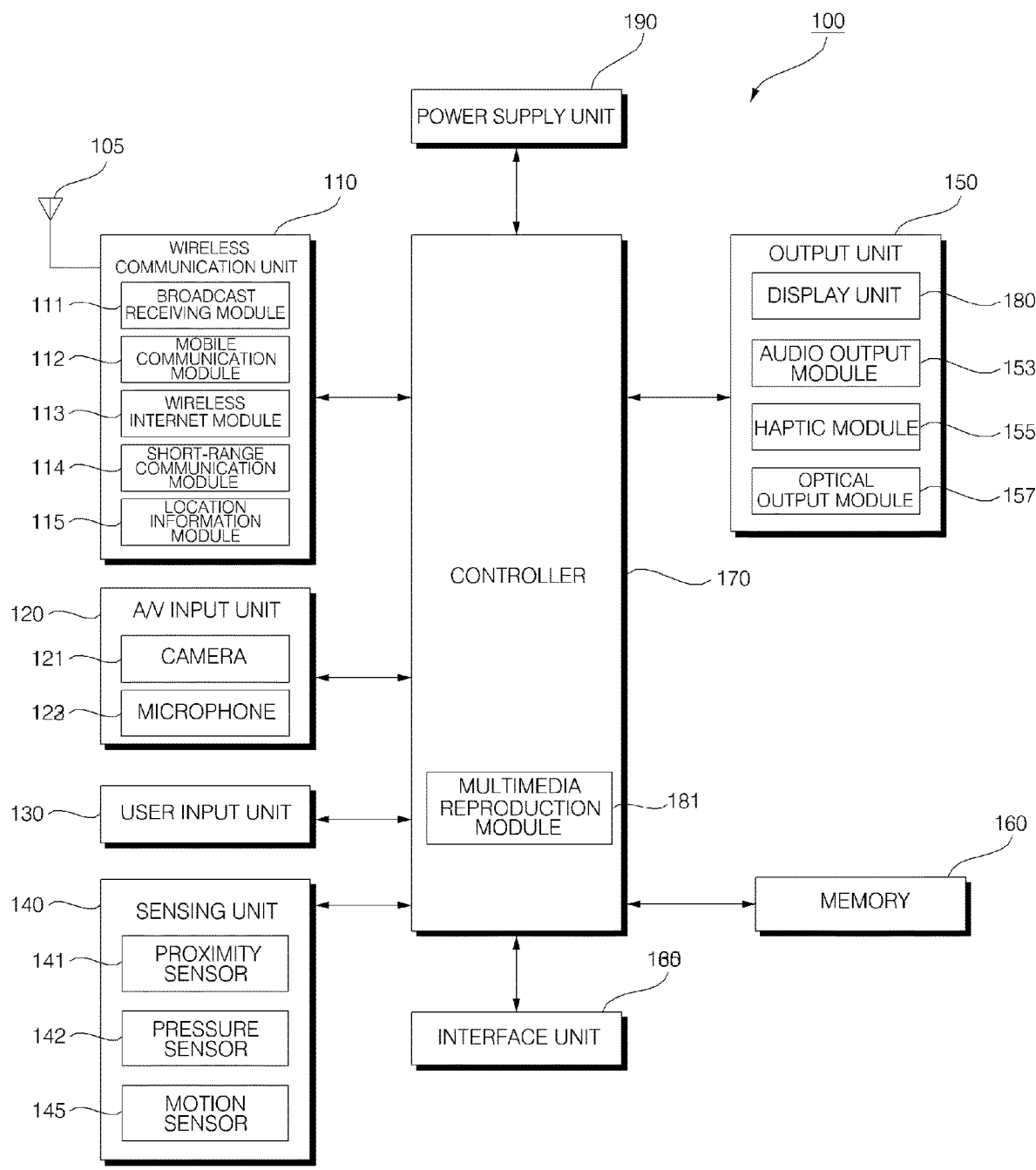
FIG. 2 is a block diagram illustrating an internal configuration of the mobile terminal illustrated in FIG. 1.
Figure 3:
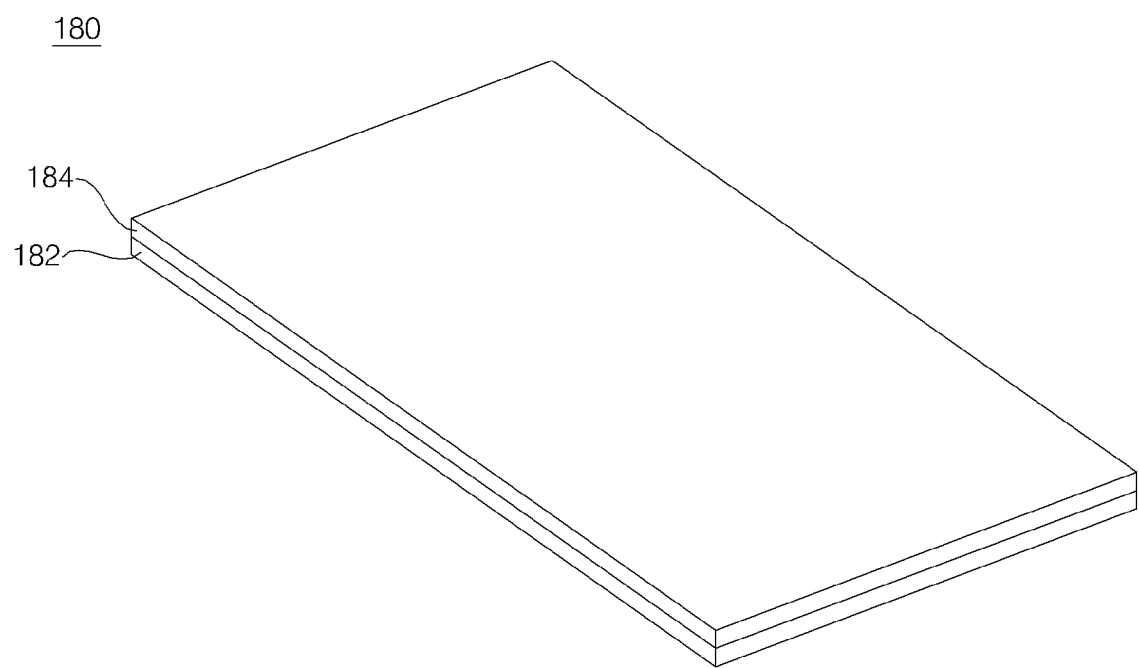
FIG. 3 is a diagram illustrating a configuration of a display illustrated in FIG. 2.

In addition, the mobile terminal 100 according to another exemplary embodiment of the present invention comprises the display 180 including the display panel 182 (in FIG. 3) and the touch panel 184 (in FIG. 3), and the controller 170 (in FIG. 2), in which in response to determination of entering an underwater mode in a state that a first region touch signal to a third region touch signal are sequentially received from the touch panel 184 (in FIG. 3), the controller 170 (in FIG. 2) increases a reference level for touch signals received from the touch panel 184 (in FIG. 3). Accordingly, in the case where the mobile terminal 100 is submerged in water, the mobile terminal 100 may perform an operation appropriate for the underwater state.

Particularly, in a state that the home screen of the underwater mode is displayed, in response to receiving a fourth region touch signal from the touch panel 184 (in FIG. 3) after increasing a reference level for the touch signals received from the touch panel is increased, the controller 170 may perform an operation corresponding to the fourth region touch signal in response to a level of the fourth region touch signal being equal to or higher than the increased reference level. Accordingly, even in the underwater mode, an operation may be performed by touch actions, thereby enhancing user convenience.

FIG. 2 is a block diagram illustrating an internal configuration of the mobile terminal illustrated in FIG. 1.

Referring to FIG. 2, the mobile terminal 100 includes a wireless communication unit 110, Audio/Video (A/V) input unit 120, a user input unit 130, a sensing unit 140, an output unit 150, a memory 160, an interface 135, a controller 170, and a power supply 190.

The wireless communication unit 110 may include a broadcast reception module 111, a mobile communication module 113, a wireless communication module 115, and a global positioning system (GPS) module 119, and the like.

The broadcast reception module 111 receives at least one of a broadcast signal and broadcast related information from an external broadcast management server through a broadcast channel. In this case, the broadcast channel may include a satellite channel, a terrestrial channel, and the like.

The broadcast signal and/or broadcast related information received by the broadcast reception module 111 may be stored in the memory 160.

The mobile communication module 113 transmits and receives a radio signal to and from at least one of a base station, an external terminal, and a server on a mobile communication network. Here, the radio signal may include various types of data based on transmission and reception of a voice call signal, a video call signal, or text/multimedia messages.

The wireless communication module 115 may refer to a module for wireless communication, and may be included inside or outside of the mobile terminal 100. For example, the wireless communication module 115 may include a first communication module 115a for Bluetooth communication, particularly Bluetooth communication based on Bluetooth Low Energy (BLE) technology, and a second communication module 115b for communication based on WiFi or WiFi Direct.

In addition, a near field communication technology may use Bluetooth, Radio Frequency Identification (RFID), Infrared Data Association (IrDA), Ultra Wideband (UWB), ZigBee, or the like.

The GPS module 119 receives positional information from a plurality of GPS satellites.

The A/V input unit 120 may be used to input an audio signal or a video signal, and may include a camera 121, a microphone 123, and the like.

The user input unit 130 generates key input data, which is input by a user to control the operation of a terminal. To this end, the user input unit 130 may include a key pad, a dome switch, a touch pad (static pressure/electrostatic), and the like. Particularly, in the case where a touchpad and the display 180 are layered, the touchpad and the display 180, which are layered, may be referred to as a touchscreen.

The sensing unit 140 detects a current state of the mobile terminal 100, the current state including an opening or closing state of the mobile terminal 100, a position of the mobile terminal 100, and information on whether a user contacts the mobile terminal 100, and the like, to generate a sensing signal to control an operation of the mobile terminal 100.

The sensing unit 140 may include a proximity sensor 141, a pressure sensor 143, a motion sensor 145, and the like. The motion sensor 145 may detect a movement or a position of the mobile terminal 100 by using an accelerometer, a gyro sensor, a G-sensor (Gravity sensor), or the like. Particularly, the gyro sensor is a sensor that measures an angular velocity, and may detect a direction which has been rotated with respect to a reference direction (angle).

The output unit 150 includes the display 180, a sound output unit 153, an alarm unit 155, a haptic module 157, and the like.

The display 180 displays and outputs information processed by the mobile terminal 100.

As described above, in the case where the display 180 and the touchpad are layered to form a touchscreen, the display 180 may be used not only as an output device but also as an input device, via which a user may input information by a user's touch action.

The sound output unit 153 outputs audio data received from the wireless communication unit 110 or stored in the memory 160. Examples of the sound output unit 153 include a speaker, a buzzer, and the like.

The alarm unit 155 outputs a signal to notify the occurrence of an event of the mobile terminal 100. For example, the alarm unit 155 may output the signal in the form of a vibration.

The haptic module 157 generates various tactile effects felt by a user. A typical example of the tactile effects generated by the haptic module 154 is vibration.

The memory 160 may store software programs for processing and controlling the controller 170, or may temporarily store data (for example, a phonebook, messages, still images, videos, etc.) which are input or output.

The interface 135 performs a function of interfacing with all the external devices connected to the mobile terminal 100. The interface 135 may receive data or power from such external device and may transmit the received data or power to each component in the mobile terminal 100, or may allow data in the mobile terminal 100 to be transmitted to the external device.

The controller 170 generally controls the operation of each component, and controls the overall operation of the mobile terminal 100. For example, the controller 170 may control and process an operation associated with a voice call, data communication, a video call, and the like. In addition, the controller 170 may further include a multimedia reproduction module 181 for reproducing multimedia contents. The multimedia reproduction module 181 may be provided as hardware in the controller 170 or may be provided as software separately from the controller 170.

The power supply 190 receives external and internal power by the control of the controller 170 and supplies power required for the operation of each component.

In addition, the block diagram of the mobile terminal 100 illustrated in FIG. 2 is only illustrative. Each component of the block diagram may be integrated, added, or omitted according to the specification of the mobile terminal 100 to be actually implemented. That is, two or more components may be combined into a single component, or a single component may be divided into two or more components as needed. In addition, the function performed by each block is intended for description of the present embodiment, and the detailed operation or device thereof does not limit the scope of the present invention.

FIG. 3 is a diagram illustrating a configuration of a display illustrated in FIG. 2.

Referring to FIG. 3, the display 180 illustrated in FIG. 2 includes the display panel 182 and the touch panel 184.

As illustrated in FIG. 3, the touch panel 184 for detecting touch may be disposed on the top of the display panel 182.

The display panel 182 may be a Liquid Crystal Display (LCD), an Organic Light Emitting Diode (OLED) display, and the like.

The touch panel 184 uses a capacitive touch sensing method, in which by using a transparent ITO electrode, the touch panel 184 may output an electric signal, corresponding to a change of capacitance, in units of cells or in units of predetermined groups.

For example, the touch panel 184 may output a touch signal, corresponding to a change of capacitance, to the controller 170.

The touch panel 184 may be configured as various types, such as an in-cell touch type, an on-cell touch type, an out-cell touch type, and the like.

In the case where there is a drop of water on the capacitive touch panel 184, the touch panel 184 may output a touch sensing signal due to the change of capacitance even when there is no user's touch with one or more fingers.

Similarly, in the case where the mobile terminal 100 with waterproof and dust proof function is submerged in water, there is a problem in that malfunction, such as ghost touch, may occur.

Figure 4A:
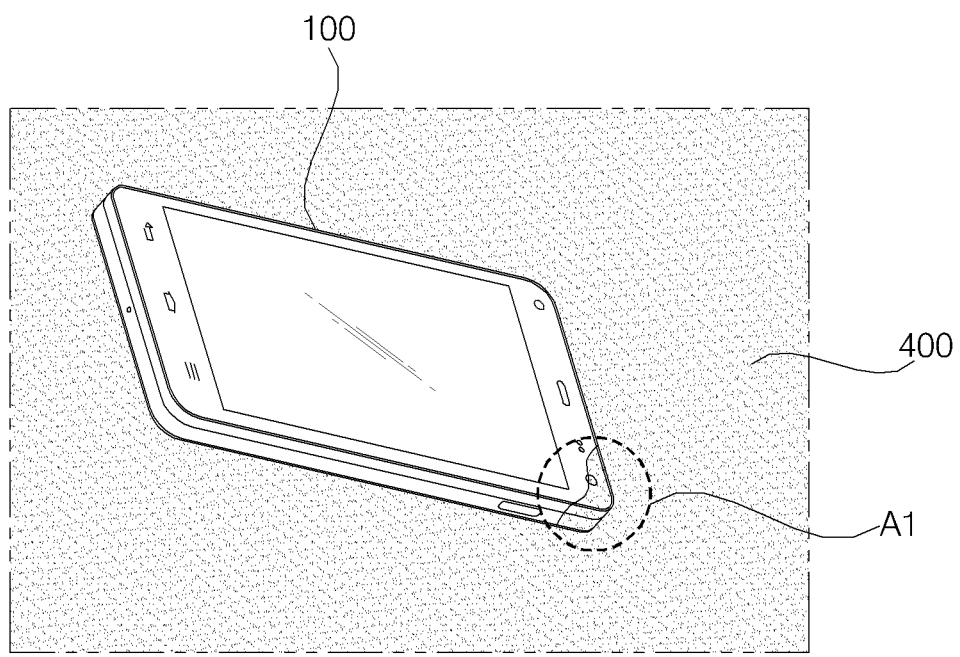
FIGS. 4A to 4C are diagrams illustrating a mobile terminal which is submerged in water.
Figure 4B:
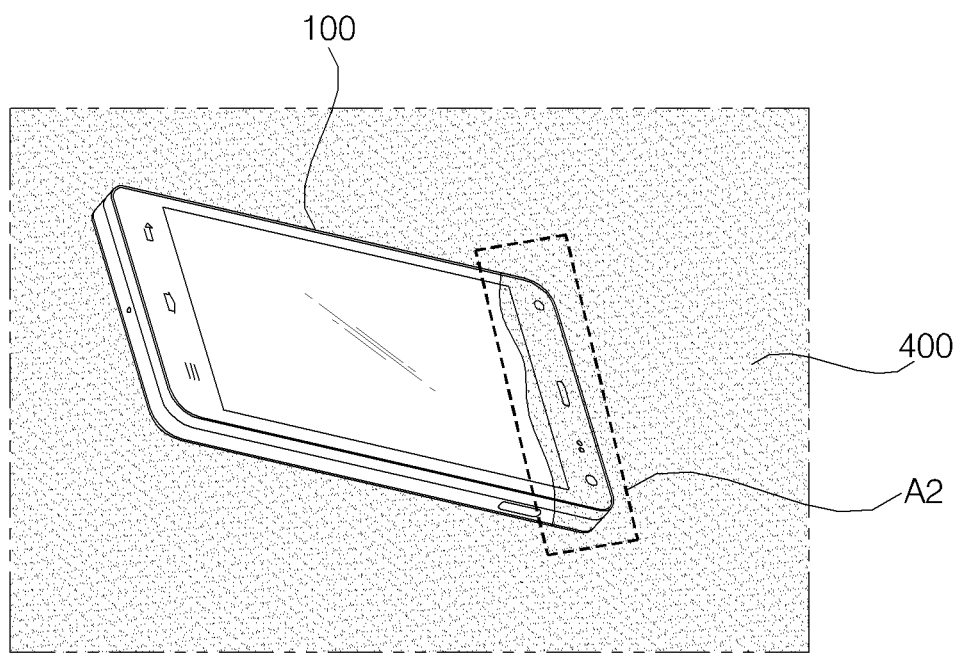
Figure 4C:
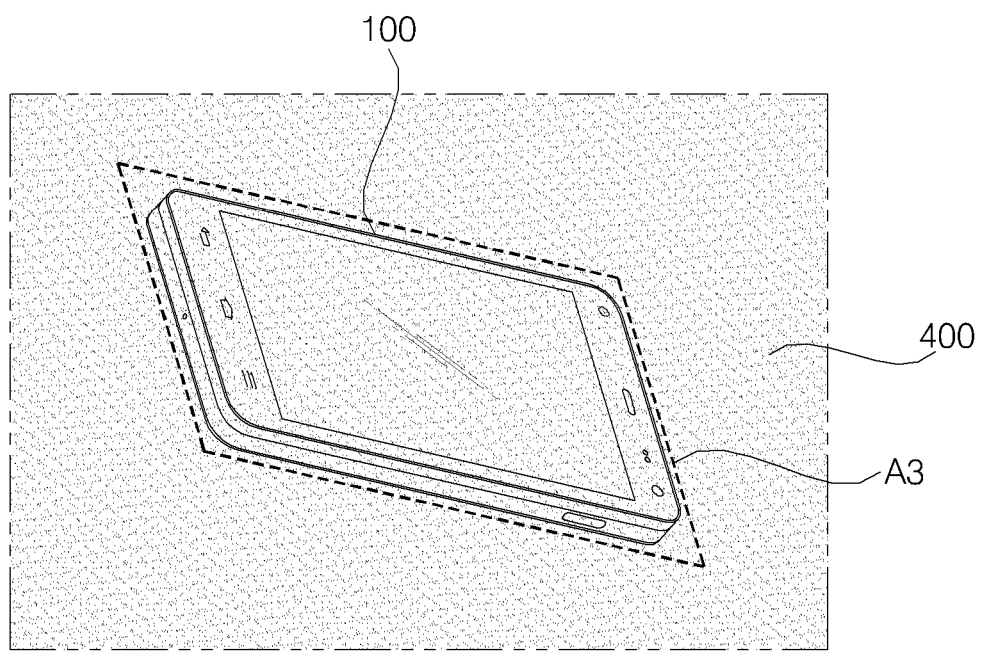

FIGS. 4A to 4C are diagrams illustrating a mobile terminal which is submerged in water.

First, FIG. 4A illustrates an example where an upper corner region A1, which is a first region of the mobile terminal 100, is submerged in water 400 at time 1.

Secondly, FIG. 4B illustrates an example where an upper end region A2, which is a second region of the mobile terminal 100, is submerged in the water 400 at time 2.

Thirdly, FIG. 4C illustrates an example where an entire region A3, which is a third region of the mobile terminal 100, is submerged in the water 400 at time 3.

When the mobile terminal 100 is submerged, the mobile terminal 100 is generally submerged in the water 400 in the order of FIGS. 4A, 4B, and 4C.

The entire region A3, which is the third region, may include the upper end region A2, which is the second region, and the upper corner region A1, which is the first region.

The upper end region A2, which is the second region, may include the upper corner region A1, which is the first region.

Figure 5A:
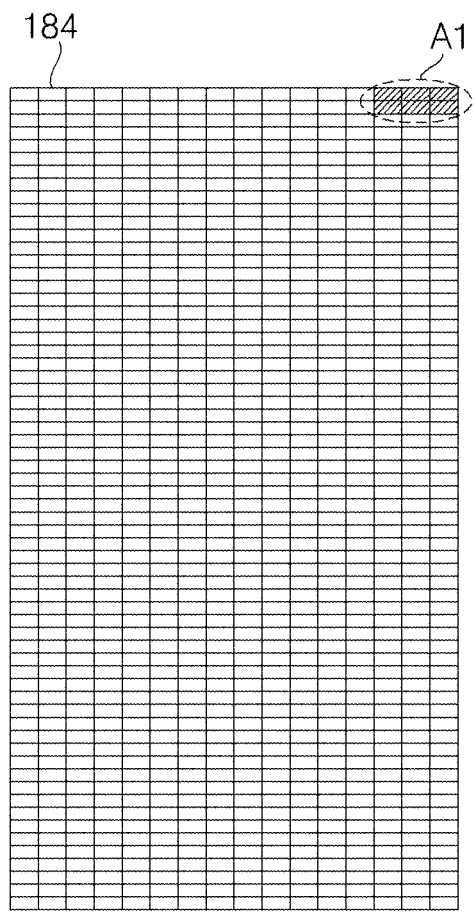
FIGS. 5A to 5C are diagrams illustrating an operational state of a touch panel when the mobile terminal is submerged in water as illustrated in FIGS. 4A to 4C.
Figure 5B:
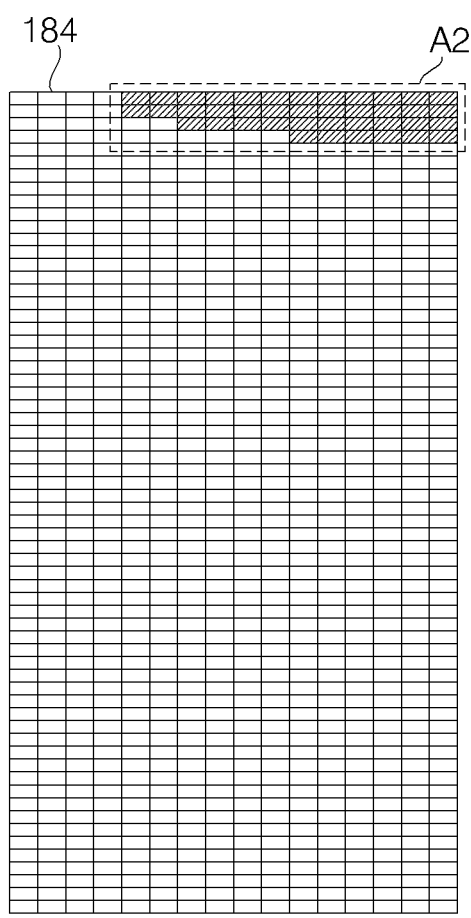
Figure 5C:
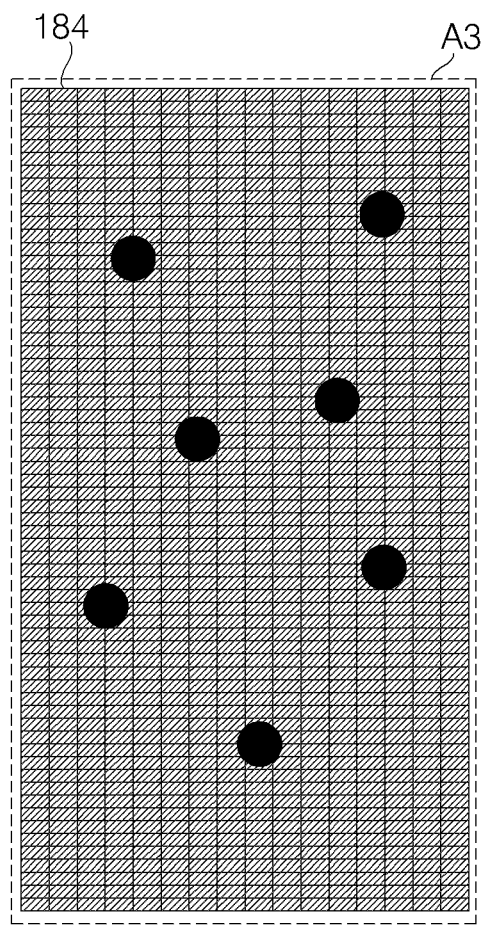

FIGS. 5A to 5C are diagrams illustrating an operational state of a touch panel when the mobile terminal is submerged in water as illustrated in FIGS. 4A to 4C.

First, FIG. 5A illustrates an example where a touch sensing signal is generated at the upper corner region A1, which is the first region of the touch panel 184, at time 1 corresponding to FIG. 4A.

Based on the generated touch sensing signal, the controller 170 determines that there is a touch with a user's finger in the upper corner region A1 which is the first region.

Secondly, FIG. 5B illustrates an example where a touch sensing signal is generated at the upper end region A2, which is the second region of the touch panel 184, at time 2 corresponding to FIG. 4B.

Based on the generated touch sensing signal, the controller 170 determines that there is a touch with a user's finger in the upper end region A2 which is the second region.

Thirdly, FIG. 5C illustrates an example where a touch sensing signal is generated at the entire region A3, which is the third region of the touch panel 184, at time 3 corresponding to FIG. 4C.

Based on the generated touch sensing signal, the controller 170 determines that there is a touch with a user's finger in the entire region A3 which is the third region.

In this case, the controller 170 may determine that there are touch inputs, regardless of a user's intention, in black regions of the touch panel 184 illustrated in FIG. 5C. Such unintended touch inputs may be referred to as ghost touch, and when the mobile terminal 100 is submerged, malfunction, such as ghost touch, may occur.

FIGS. 6A to 6F are diagrams illustrating an operation of the mobile terminal when the mobile terminal is submerged in water as illustrated in FIGS. 4A to 4C.

Figure 6A:
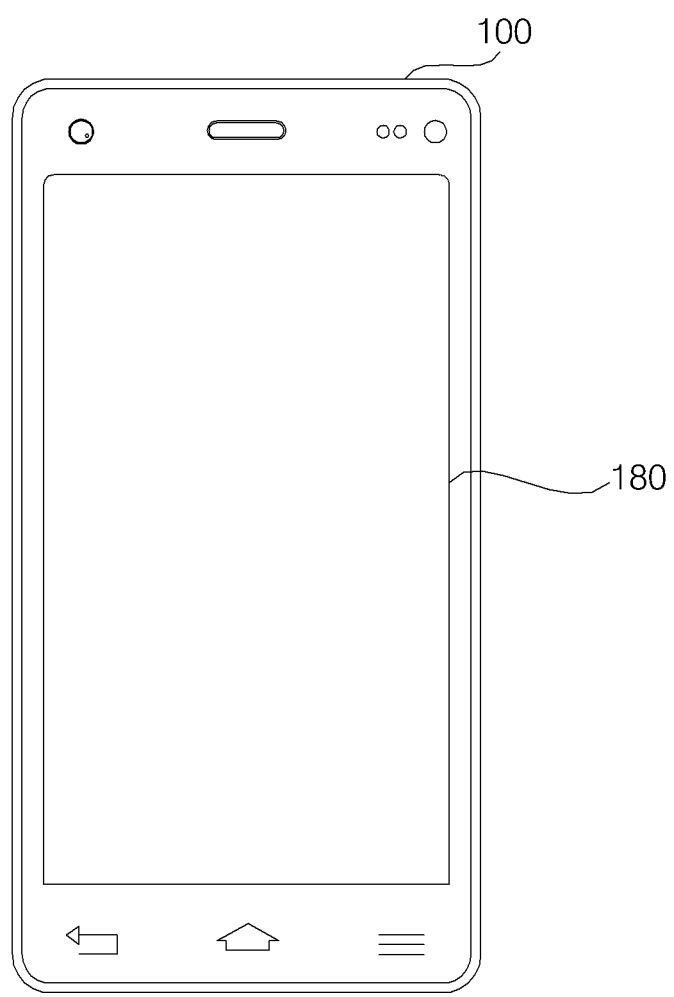
FIGS. 6A to 6F are diagrams illustrating an operation of a mobile terminal when the mobile terminal is submerged in water as illustrated in FIGS. 4A to 4C.
Figure 6B:
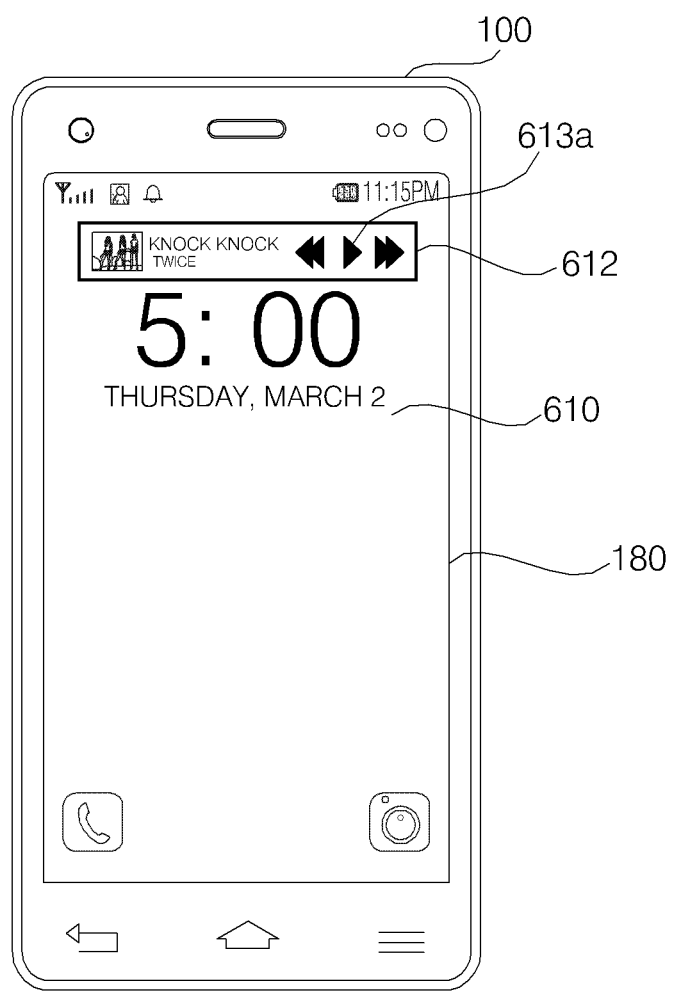
Figure 6C:
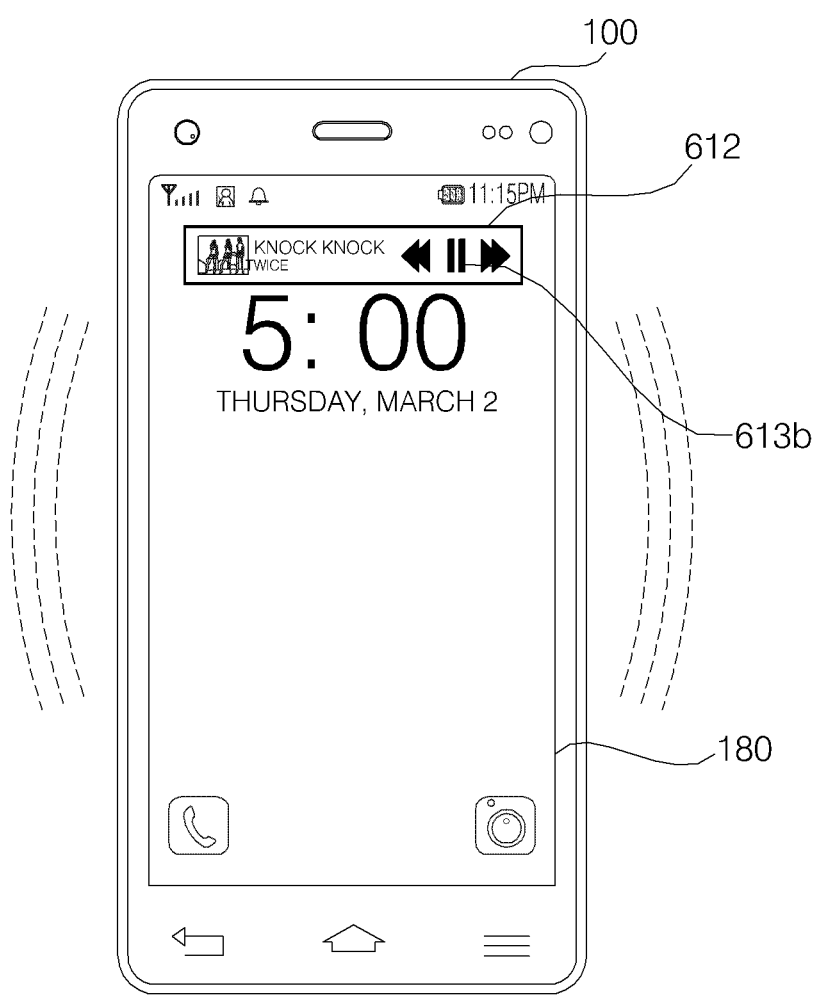

First, FIGS. 6A to 6C illustrate an example of malfunction caused by ghost touch when the screen of the mobile terminal 100 is turned off.

As illustrated in FIG. 6A, in the case where the upper corner region A1, which is the first region, is submerged in the water 400 as illustrated in FIG. 4A in a state that the screen of the mobile terminal 100 is turned off, the controller 170 determines that there is a touch input in the upper corner region A1 which is the first region, and displays an idle screen 610 as illustrated in FIG. 6B.

Here, the idle screen 610 is a lock screen and may display time information, items that are executable on the idle screen, and the like.

Particularly, FIG. 6B illustrates the idle screen 610 on which a music playing application item 612 with a play sign 613a is displayed.

As illustrated in FIG. 6B, in the case where the upper end region A2, which is the second region, is submerged in the water 400 as illustrated in FIG. 4B in a state that the idle screen 610 of the mobile terminal 100 is displayed, the controller 170 determines that there is a touch input in the upper end region A2 which is the second region, and may execute the music playing application as illustrated in FIG. 6C.

Accordingly, a sound may be output as the music playing application is executed, which may be performed under water even when the operation is unintended by a user, thus resulting in unnecessary power consumption.

FIG. 6C illustrates the idle screen 610, on which the music playing application item 612 with a pause sign 613b is displayed, in a state that the music is playing.

As illustrated in FIG. 6C, in the case where the entire region A3, which is the third region, is submerged in the water 400 as illustrated in FIG. 4C in a state that the music playing application is executed, the controller 170 determines that there is ghost touch in any portion of the entire region A3 which is the third region, and executes other application in a state that the music playing application is executed or changes the playing music file to other music file, and the like. As a result, an operation unintended by a user or malfunction may occur.

Figure 6D:
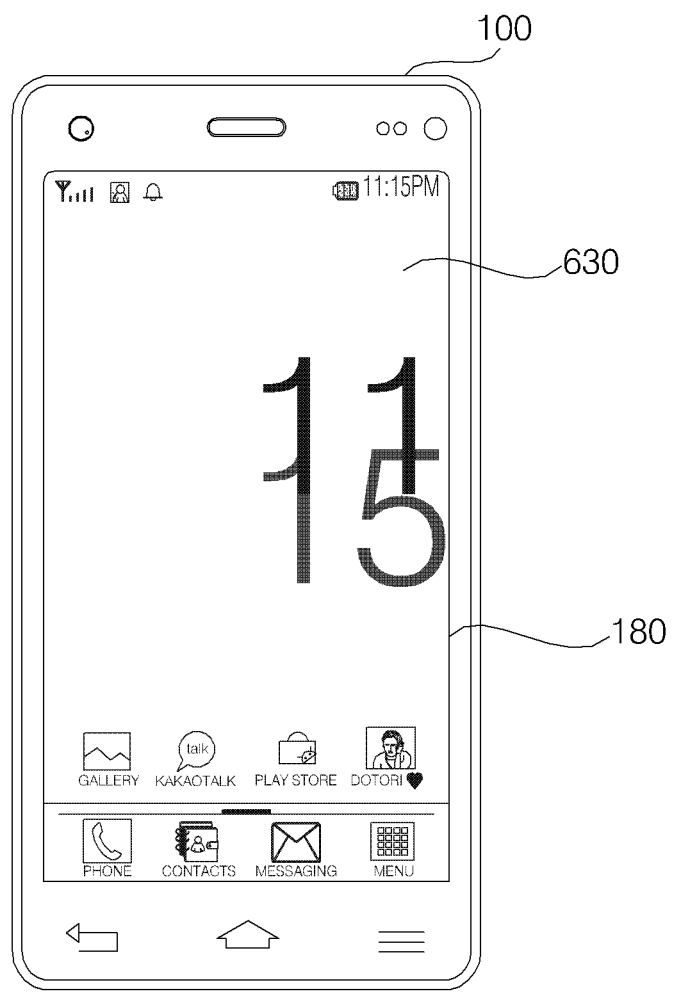
Figure 6E:
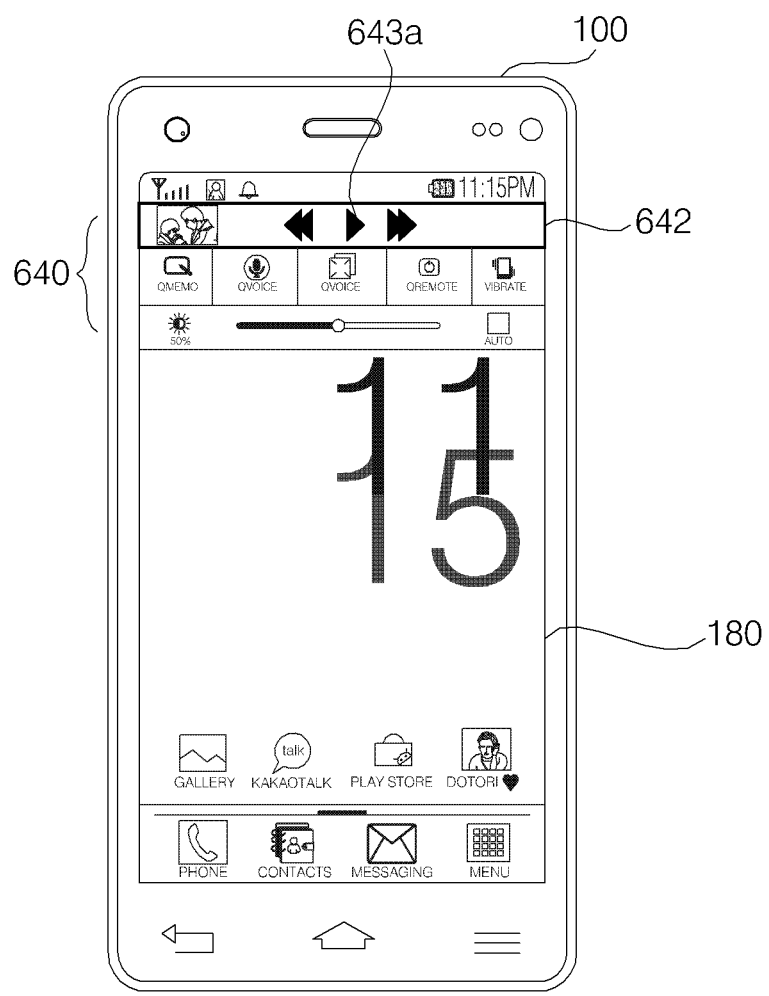
Figure 6F:
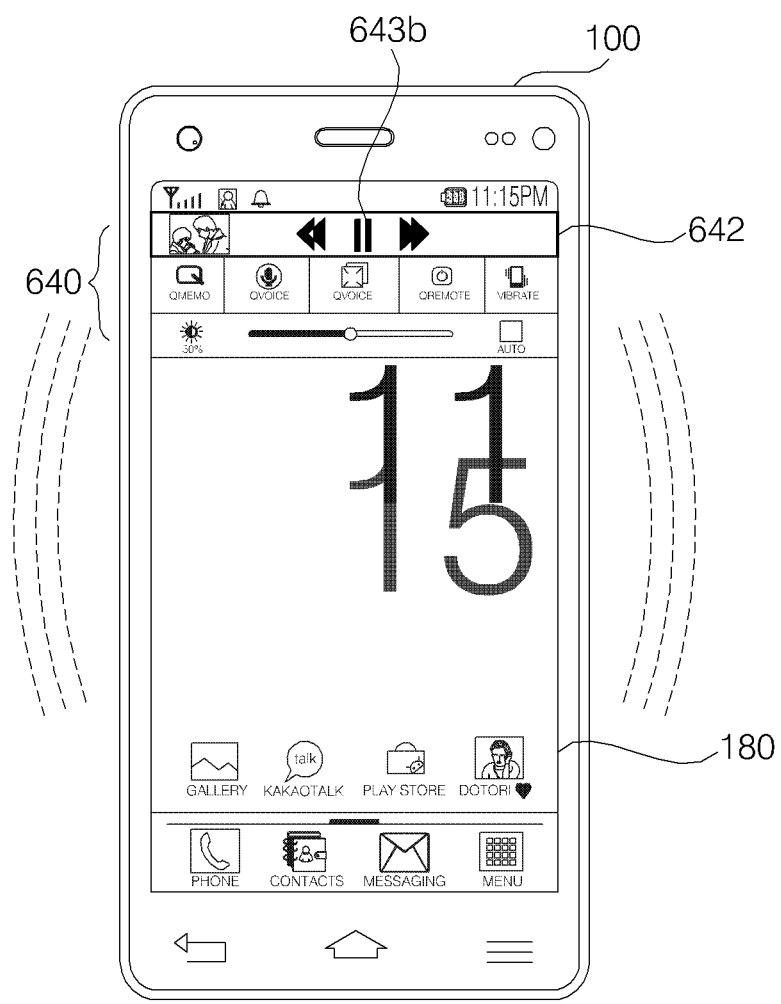

Then, FIGS. 6D to 6F are diagrams illustrating an example where ghost touch causes malfunction in a state that a home screen 630 of the mobile terminal 100 is displayed.

As illustrated in FIG. 6D, in the case where the upper corner region A1, which is the first region, is submerged in the water 400 as illustrated in FIG. 4A in a state that the home screen 630 of the mobile terminal 100 is displayed, the controller 170 determines that there is a touch input in the upper corner region A1 which is the first region, and displays a status bar 640 on the home screen 630 as illustrated in FIG. 6E.

Here, the status bar 640 includes various setting items, executable items, and the like.

Particularly, FIG. 6E illustrates the status bar 640 which includes the music playing application item 642 with the play sign 643a.

As illustrated in FIG. 6E, in the case where the upper end region A2, which is the second region, is submerged in the water 400 as illustrated in FIG. 4B in a state that the status bar 640 is displayed on the mobile terminal 100, the controller 170 determines that there is a touch input in the upper end region A2 which is the second region, and may execute the music playing application as illustrated in FIG. 6F.

Accordingly, a sound may be output as the music playing application is executed, which may be performed under water even when the operation is unintended by a user, thus resulting in unnecessary power consumption.

FIG. 6F illustrates the status bar 640, indicating the music playing application item 642 with the pause sign 643b, in a state that the music is playing.

As illustrated in FIG. 6F, in the case where the entire region A3, which is the third region, is submerged in the water 400 as illustrated in FIG. 4C in a state that the music playing application is executed, the controller 170 determines that there is ghost touch in any portion of the entire region A3 which is the third region, and executes other application in a state that the music playing application is executed or changes the playing music file to other music file, and the like. Accordingly, an operation unintended by a user or malfunction may occur.

Figure 7:
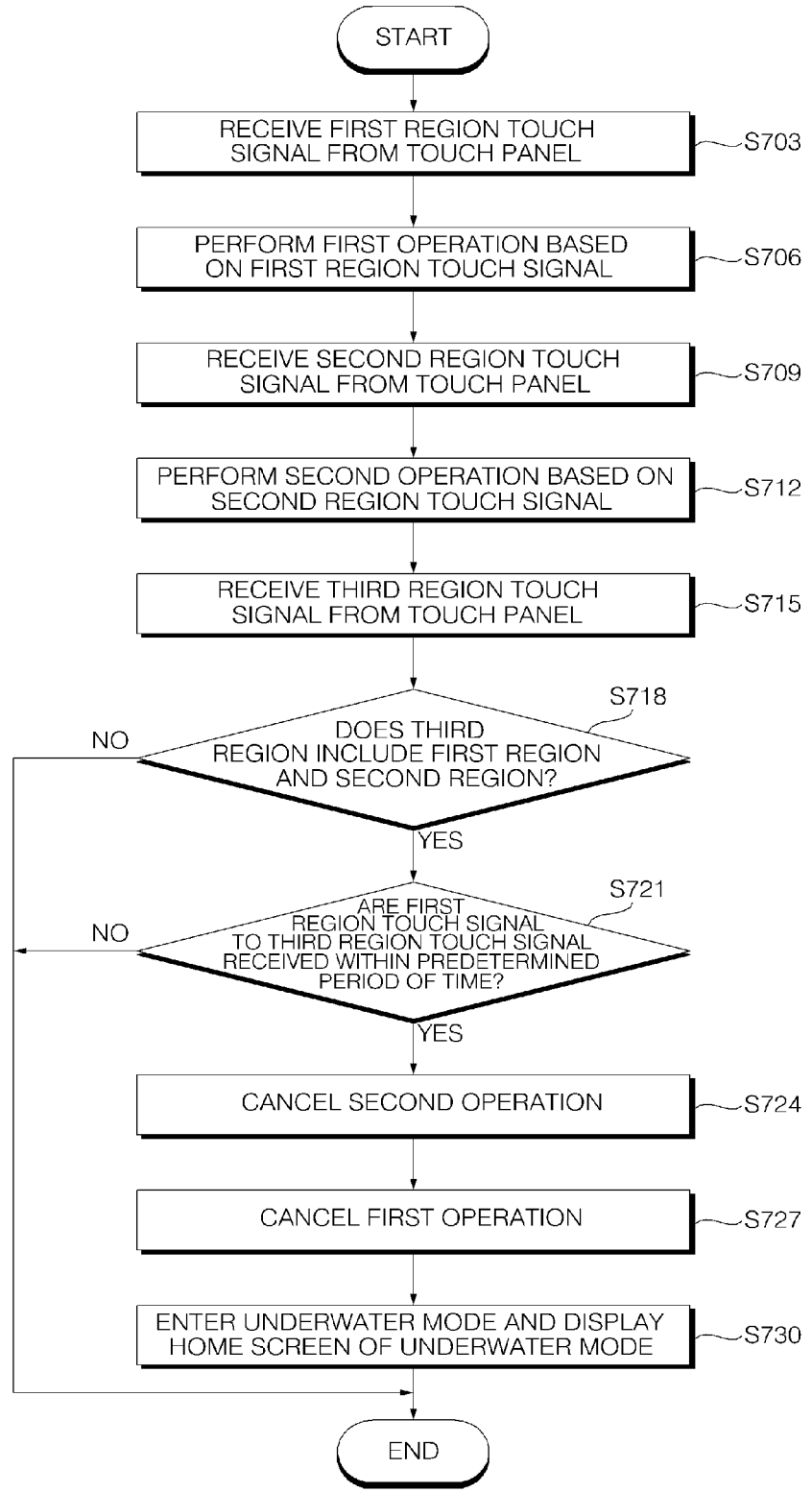
FIG. 7 is a flowchart illustrating a method of operating a mobile terminal according to an embodiment of the present invention.

FIG. 7 and the following figures illustrate a method of preventing malfunction, which is caused by the ghost touch unintended by a user as illustrated in FIGS. 6A to 6F.

FIG. 7 is a flowchart illustrating a method of operating a mobile terminal according to an embodiment of the present invention, and FIGS. 8A to 9G are diagrams referred to in the description of the method of operating the mobile terminal illustrated in FIG. 7.

Referring to FIG. 7, in the case where the upper corner region A1, which is the first region of the mobile terminal 100, is submerged in the water 400 at time 1 as illustrated in FIG. 4A, the controller 170 of the mobile terminal 100 may receive a first region touch signal from the touch panel 184 in S703. Then, the controller 170 of the mobile terminal 100 may perform a first operation based on the first region touch signal in S706.

Figure 8A:
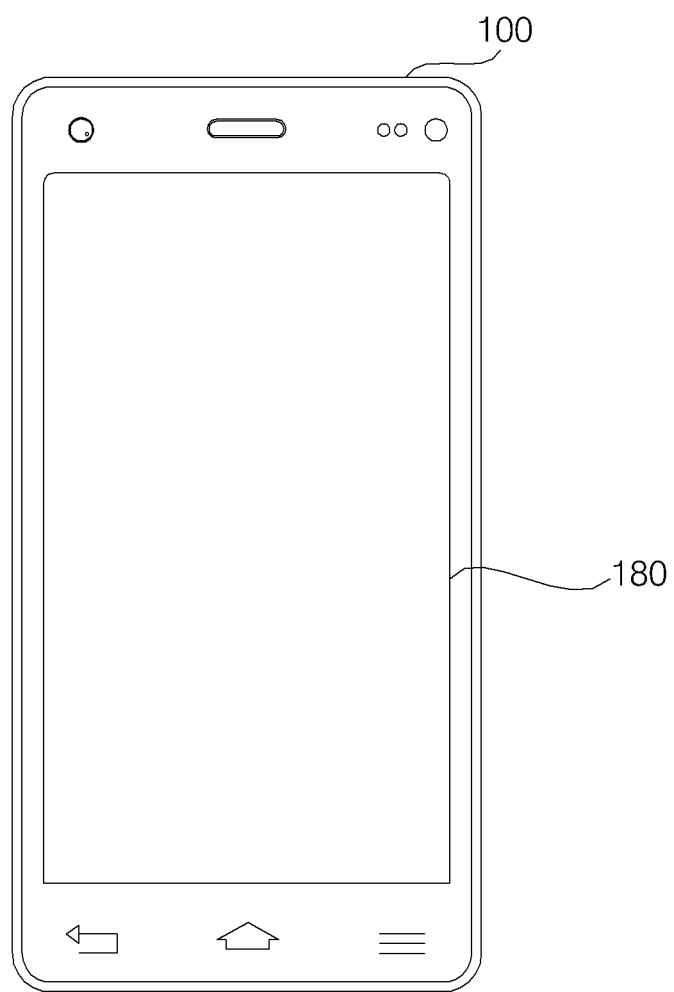
FIGS. 8A to 9G are diagrams referred to in the description of the method of operating the mobile terminal illustrated in FIG. 7.

FIG. 8A illustrates an example where the screen of the mobile terminal 100 is turned off.

Figure 8B:
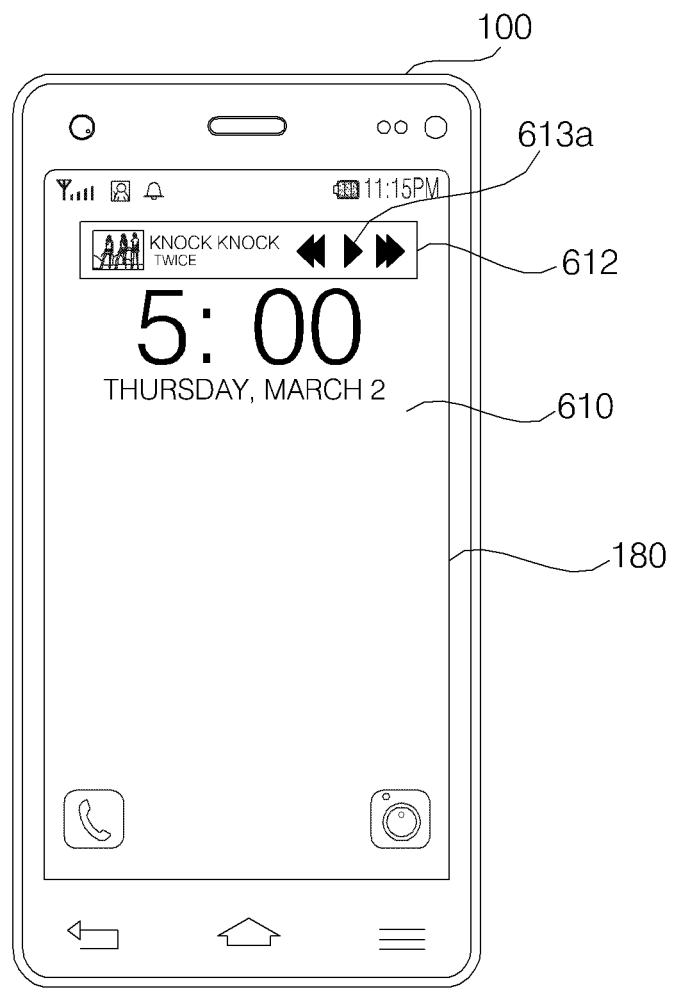

In the case where the upper corner region A1, which is the first region of the mobile terminal 100, is submerged in the water 400 at time 1 as illustrated in FIG. 4A, the controller 170 of the mobile terminal 100 determines, based on the first region touch signal received from the touch panel 184, that there is a touch input in the upper corner region A1 which is the first region, and may be configured to display the idle screen 610 as illustrated in FIG. 8B. Then, in the case where the upper end region A2, which is the second region of the mobile terminal 100, is submerged in the water 400 at time 2 as illustrated in FIG. 4B, the controller 170 of the mobile terminal 100 may receive a second region touch signal from the touch panel 184 in S709. Then, the controller 170 of the mobile terminal 100 may perform a second operation based on the second region touch signal in S712.

FIG. 8A illustrates an example where the screen of the mobile terminal 100 is turned off.

Figure 8C:
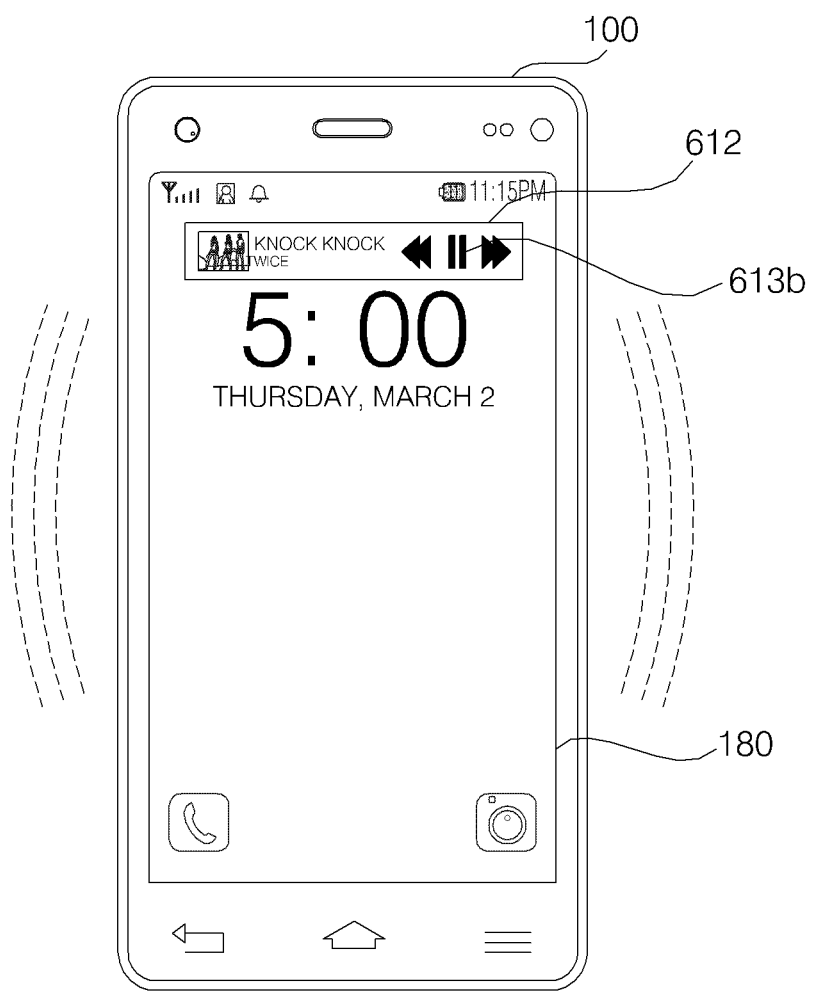

In the case where the upper end region A2, which is the second region of the mobile terminal 100, is submerged in the water 400 at time 2 as illustrated in FIG. 4B, the controller 170 of the mobile terminal 100 determines, based on the second region touch signal received from the touch panel 184, that there is a touch input in the upper end region A2 which is the second region, and may execute the music playing application 612 as illustrated in FIG. 8C.

FIG. 8C illustrates the idle screen 610, on which the music playing application item 612 with a pause sign 613b is displayed, in a state that the music is playing.

In the case where the entire region A3, which is the third region of the mobile terminal 100, is submerged in the water 400 at time 3 as illustrated in FIG. 4C, the controller 170 of the mobile terminal 100 may receive a third region touch signal from the touch panel 184 in S715.

In the case where the first region touch signal to the third region touch signal are received sequentially from the touch panel 184, the controller 170 of the mobile terminal 100 may determine whether the mobile terminal 100 is in an underwater mode. Particularly, in the case where the first region touch signal to the third region touch signal are received sequentially, it is required to determine whether the mobile terminal 100 is in an underwater mode, so as to prevent malfunction which may be caused by ghost touch.

In order to determine whether the mobile terminal 100 is in an underwater mode, the controller 170 of the mobile terminal 100 determines whether the third region includes the first region and the second region in S718, and if so, the controller 170 may determine whether the first region touch signal to the third region touch signal are received within a predetermined period of time in S721.

That is, in the case where the first region touch signal to the third region touch signal are received within the predetermined period of time, and the third region includes the second region and the first region, the controller 170 determines that the mobile terminal 100 is submerged in water, and controls the mobile terminal 100 to enter the underwater mode.

Further, in addition to the determination whether the third region includes the second region and the first region, the controller 170 may also determine whether the second region includes the first region.

That is, in the case where the mobile terminal 100 is sequentially submerged in the water 400 in the order of FIGS. 4A, 4B, and 4C, the controller 170 of the mobile terminal 100 determines that the mobile terminal 100 is submerged, and controls the mobile terminal 100 to enter the underwater mode.

Once the mobile terminal 100 enters the underwater mode, the controller 170 may cancel previously performed operations.

That is, the controller 170 of the mobile terminal 100 may cancel the second operation in S724.

Figure 8D:
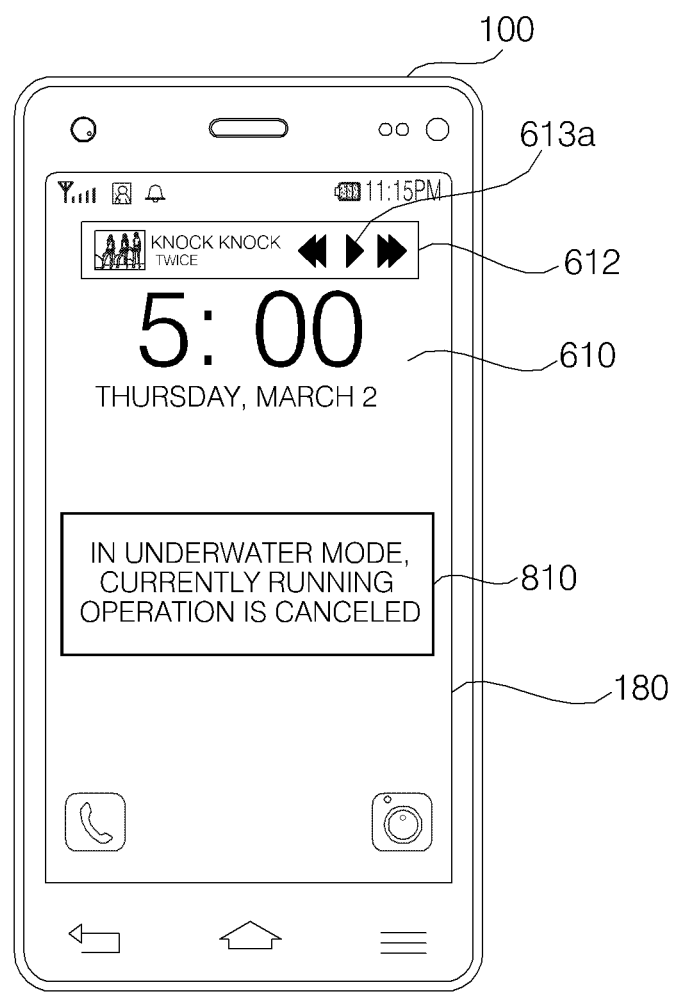

That is, as illustrated in FIG. 8D, the controller 170 of the mobile terminal 100 may stop playing music in the music playing application item 612.

Accordingly, FIG. 8D illustrates the music playing application item 612 with the play sign 613a, which is displayed instead of the pause sign 613b as music stops playing.

In addition, the controller 170 of the mobile terminal 100 may be configured to display an object 810 which indicates that as the mobile terminal 100 is in the underwater mode, an operation, which is being executed, is canceled. Accordingly, a user may recognize that malfunction is canceled in the underwater mode.

Further, after displaying the object 810 which indicates operation cancellation, the controller 170 of the mobile terminal 100 may be configured to display the idle screen 610 without the object 810.

Moreover, upon cancelling the second operation, the controller 170 of the mobile terminal 100 may sequentially cancel the first operation in S727.

Figure 8E:
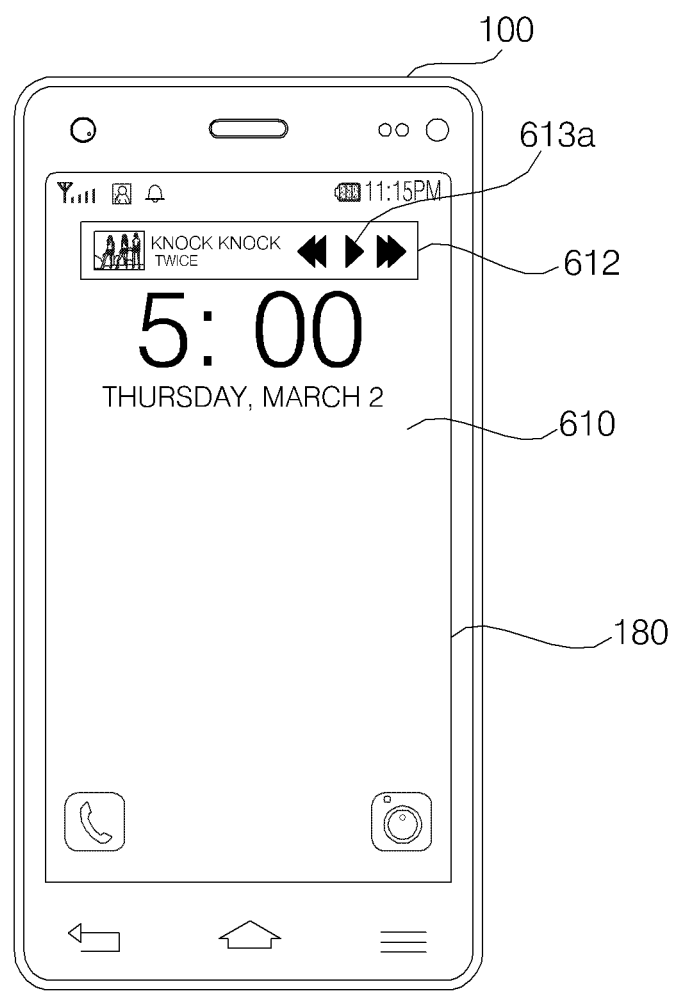
Figure 8F:
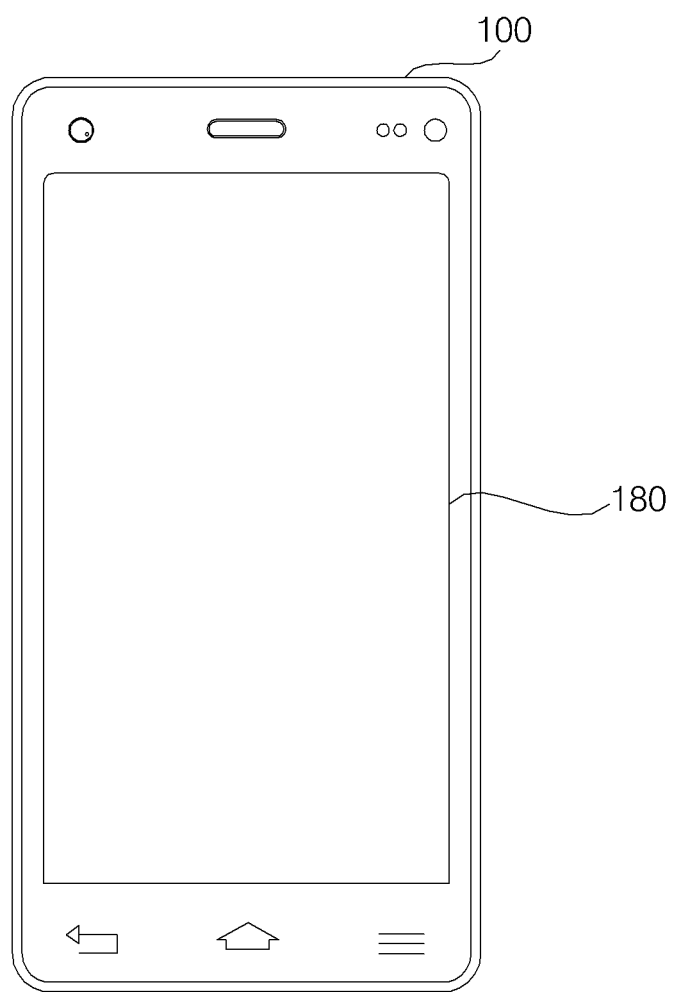

For example, the controller 170 of the mobile terminal 100 may control the screen of the mobile terminal 100, which is the idle screen 610 in FIG. 8E, to be turned off as illustrated in FIG. 8F. Accordingly, the mobile terminal 100 returns to an original operation state where there is no user's touch, thereby preventing malfunction caused by ghost touch.

Figure 9A:
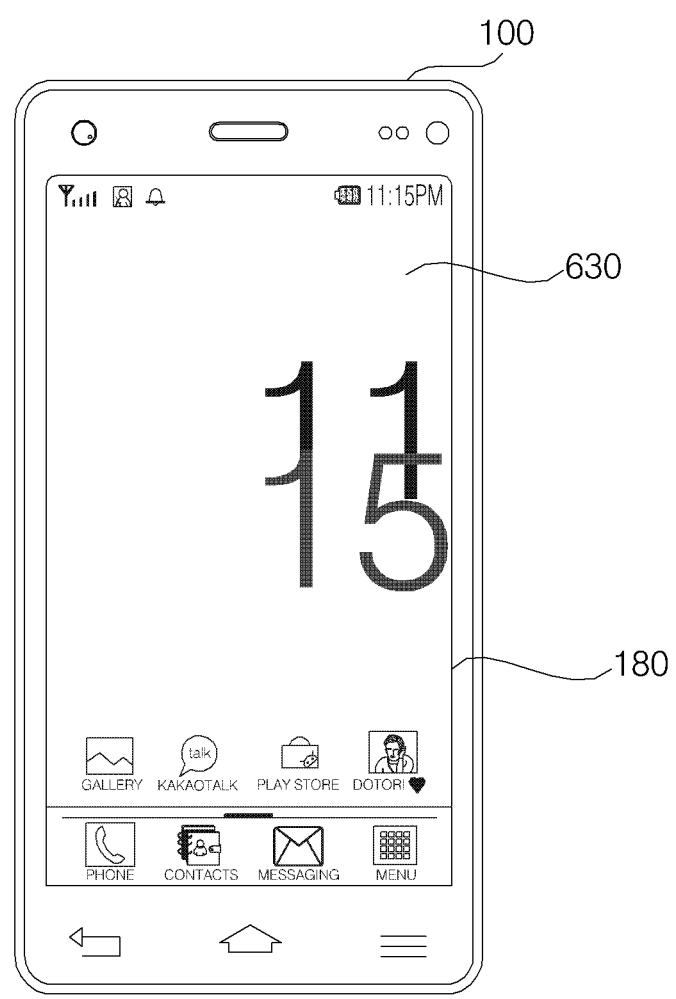
Figure 9B:
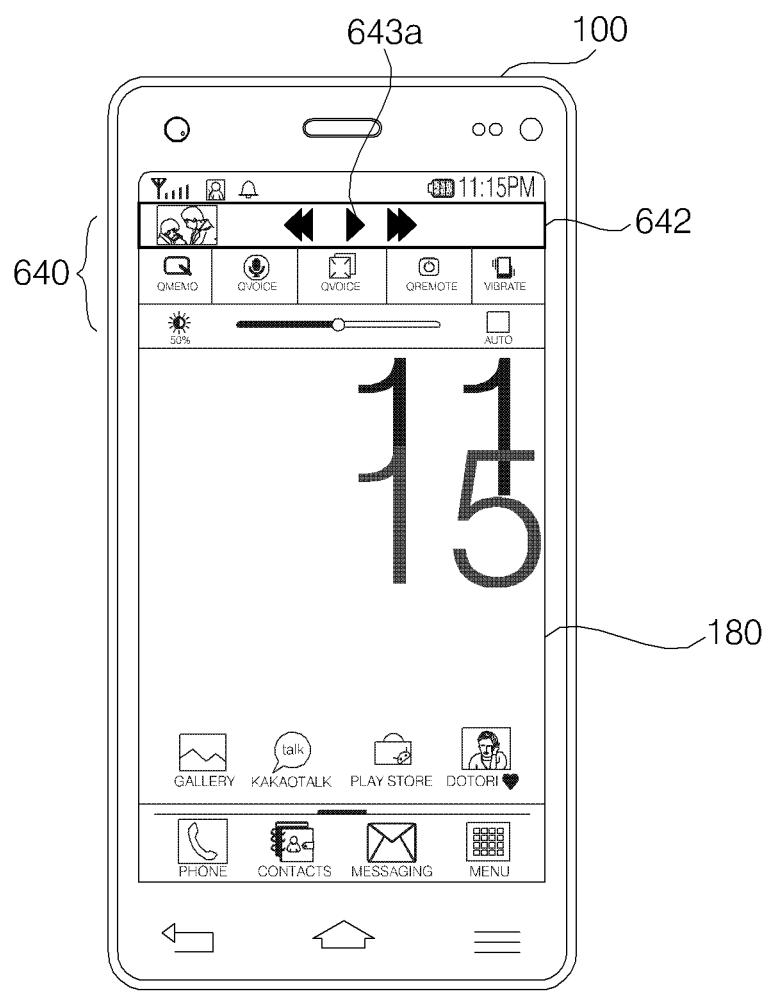
Figure 9C:
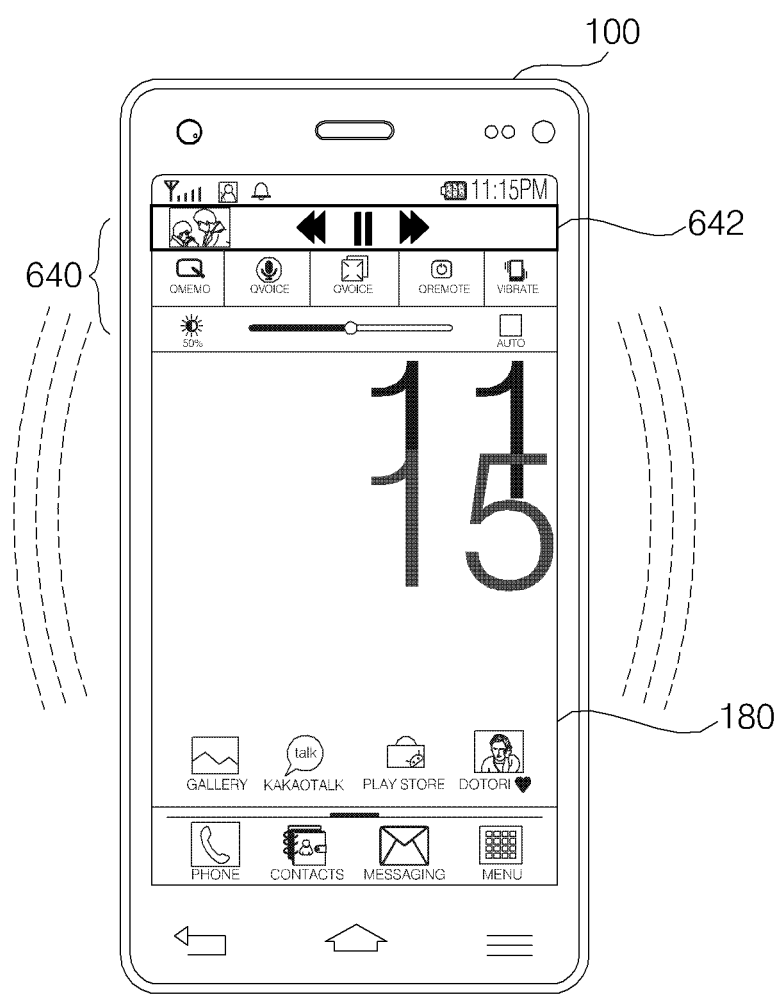
Figure 9D:
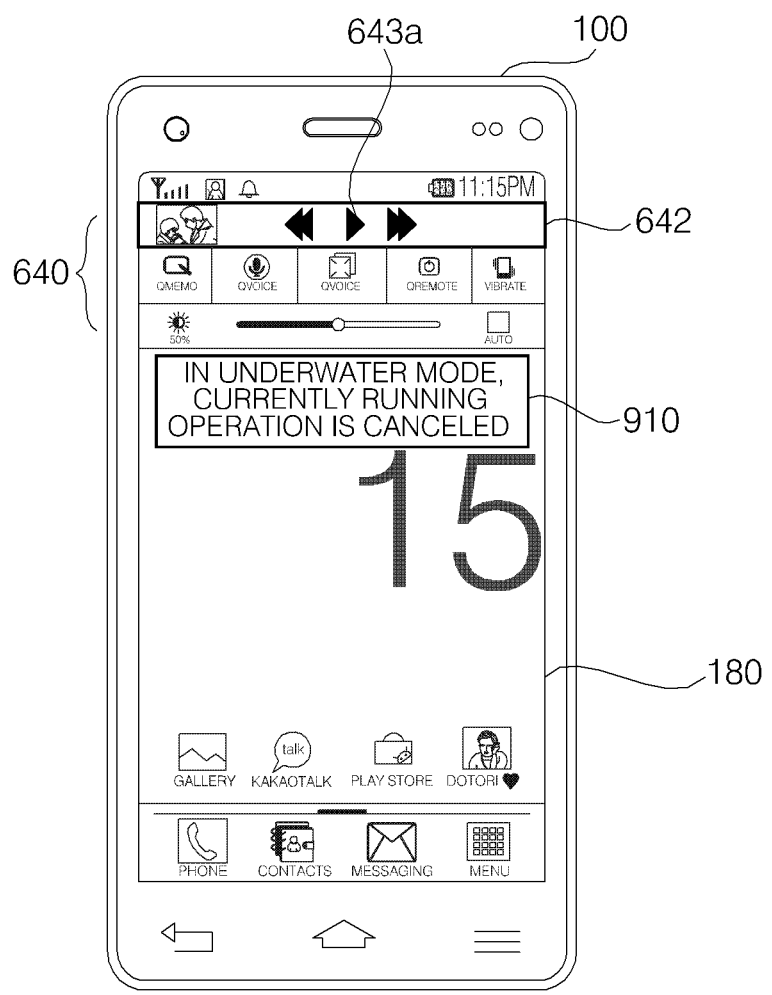
Figure 9E:
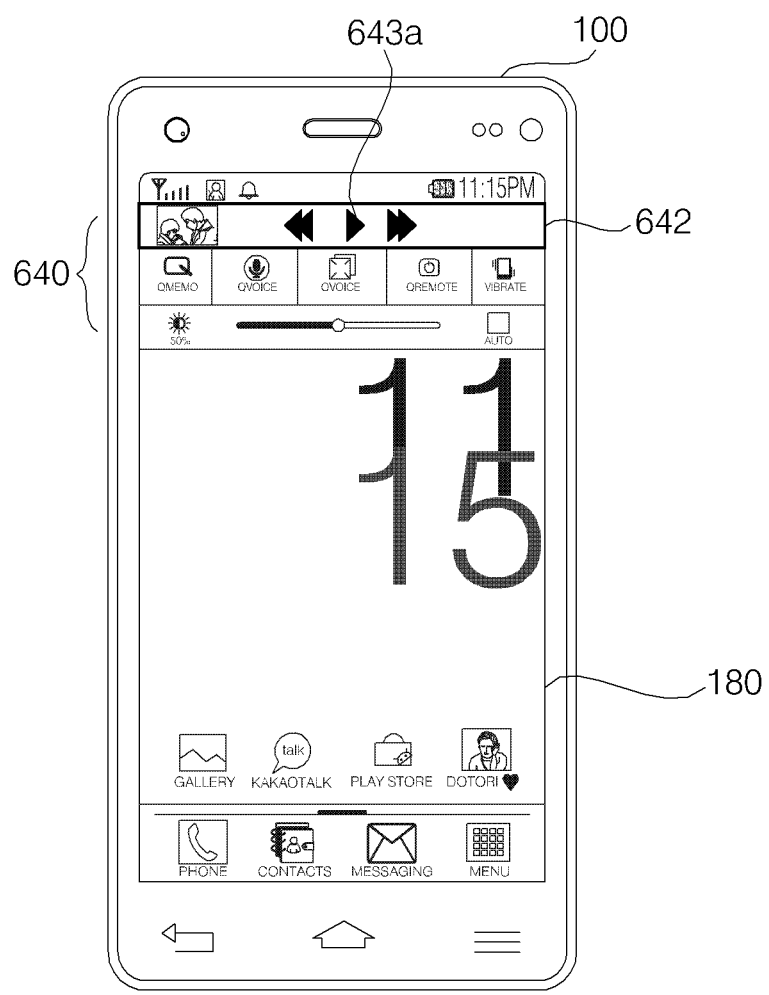
Figure 9F:
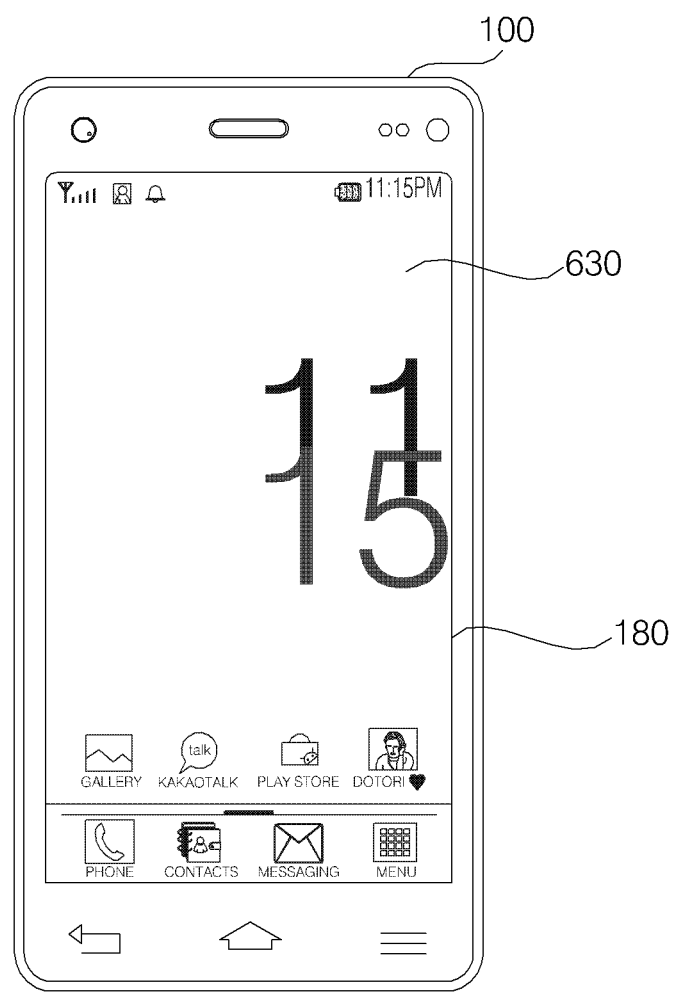
Figure 9G:
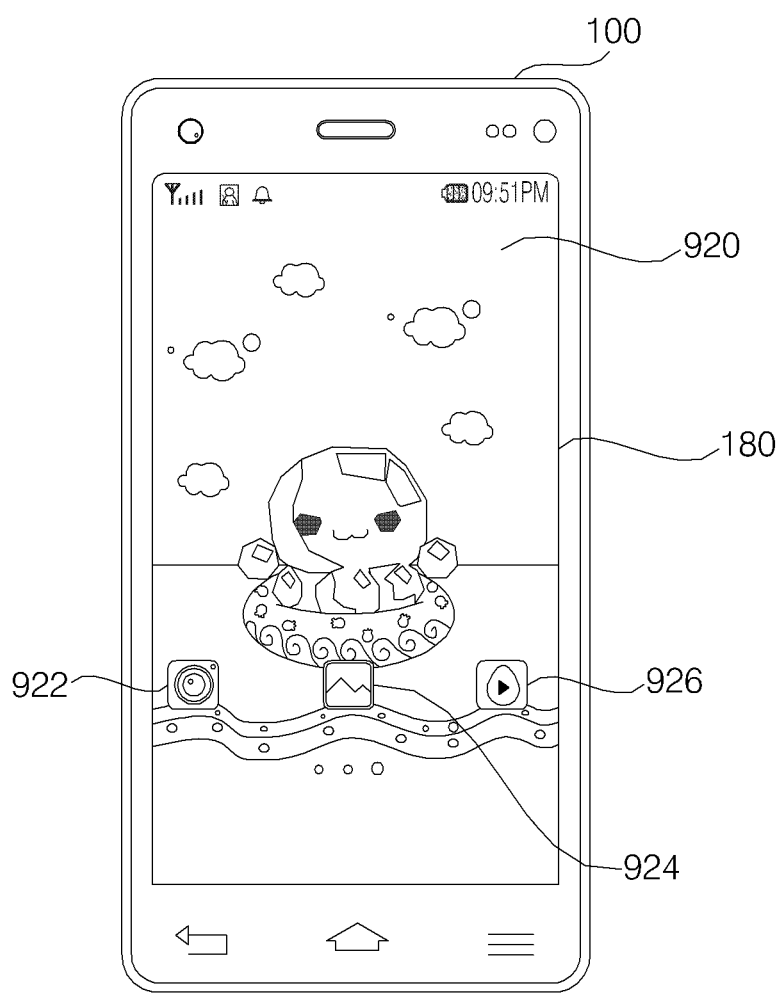

In addition, after the first operation is cancelled, the mobile terminal 100 enters the underwater mode, and the controller 170 of the mobile terminal 100 may be configured to display the home screen 920 of the underwater mode as illustrated in FIG. 9G.

Referring to FIG. 9G, the home screen 920 of the underwater mode includes an image representative of the underwater mode, and application items 922, 924, and 926 which may be executed in the underwater mode.

FIG. 9G illustrates a camera item 922, a gallery item 924, and a music item 926 as the application items which may be executed in the underwater mode.

The application items that may be executed in the underwater mode may be default items provided by a manufacturer.

Alternatively, the application items that may be executed in the underwater mode may be changed and set by a user.

For example, in a state that a menu for the home screen of the underwater mode is displayed, the image of the home screen of the underwater mode, the application items, and the like may be selected by a user's setting.

Further, the controller 170 of the mobile terminal 100 may control items displayed on the home screen 920 of the underwater mode to be set differently from items of the home screen displayed before the home screen 920.

A call function and the like may be limited in the underwater mode, such that the controller 170 of the mobile terminal 100 may control a call item to be deactivated or not to be displayed on the home screen 920 of the underwater mode.

Once the mobile terminal 100 is in the underwater mode, the controller 170 of the mobile terminal 100 may stop the operation of a communication unit 110.

When displaying the home screen of the underwater mode, the controller 170 of the mobile terminal 100 may control the brightness of the home screen of the underwater mode or the size of items displayed on the home screen of the underwater mode to be greater than the brightness of a home screen before the underwater mode or the size of items displayed on the home screen before the underwater mode. In this manner, in a state that being under water, a user may better recognize the items displayed on the home screen 920 of the underwater mode.

In the case where in a state that the home screen of the underwater mode is displayed, any one item is selected from those on the home screen of the underwater mode, the controller 170 of the mobile terminal 100 may execute an operation corresponding to the selected item.

With respect to operations S703 to S727 illustrated in FIG. 7, operations performed in a state that the screen is turned off or is an idle mode screen were described above with reference to FIGS. 8A to 8F.

Hereinafter, with respect operations S703 to S727 illustrated in FIG. 7, operations performed in a state that the home screen of the mobile terminal is displayed will be described below with reference to FIGS. 9A to 9F.

FIG. 9A illustrates an example of displaying a home screen 630 in the mobile terminal 100.

In the case where the upper corner region A1, which is the first region of the mobile terminal 100, is submerged in the water 400 at time 1 as illustrated in FIG. 4A, the controller 170 of the mobile terminal 100 determines, based on the first region touch signal received from the touch panel 184, that there is a touch input in the upper corner region A1 which is the first region, and may be configured to display a status bar 640 on the home screen 630 as illustrated in FIG. 9B.

Here, the status bar 640 includes various setting items, executable items, and the like.

Particularly, FIG. 9B illustrates the status bar 640 which includes the music playing application item 642 with the play sign 643a.

In the case where the upper end region A2, which is the second region of the mobile terminal 100, is submerged in the water 400 at time 2 as illustrated in FIG. 4B, the controller 170 of the mobile terminal 100 determines, based on the second region touch signal received from the touch panel 184, that there is a touch input in the upper end region A2 which is the second region, and may execute a music playing application 642 as illustrated in FIG. 9C.

FIG. 9C illustrates the status bar 640, indicating the music playing application item 642 with the pause sign 643b, in a state that the music is playing.

In the case where the first region touch signal to the third region touch signal are received sequentially from the touch panel 184, the controller 170 of the mobile terminal 100 may determine whether the mobile terminal 100 is in an underwater mode. Particularly, in the case where the first region touch signal to the third region touch signal are received sequentially, it is required to determine whether the mobile terminal 100 is in an underwater mode, so as to prevent malfunction which may be caused by ghost touch.

In the case where the first region touch signal to the third region touch signal are received within a predetermined period of time, and the third region includes the second region and the first region, the controller 170 of the mobile terminal 100 determines that the mobile terminal 100 is submerged in water, and controls the mobile terminal 100 to enter the underwater mode.

Further, in addition to the determination whether the third region includes the second region and the first region, the controller 170 of the mobile terminal 100 may also determine whether the second region includes the first region.

That is, in the case where the mobile terminal 100 is sequentially submerged in the water 400 in the order of FIGS. 4A, 4B, and 4C, the controller 170 of the mobile terminal 100 determines that the mobile terminal 100 is submerged, and controls the mobile terminal 100 to enter the underwater mode.

Once the mobile terminal 100 enters the underwater mode, the controller 170 may cancel previously performed operations.

For example, as illustrated in FIG. 9D, the controller 170 of the mobile terminal 100 may stop playing music in the music playing application item 642.

Accordingly, FIG. 9D illustrates the music playing application item 642 with the play sign 643a, which is displayed instead of the pause sign 643b as music stops playing.

In addition, the controller 170 of the mobile terminal 100 may be configured to display an object 910, which indicates that as the mobile terminal 100 is in the underwater mode, an operation, which is being executed, is canceled. Accordingly, a user may recognize that malfunction is canceled in the underwater mode.

Further, after displaying the object 910 which indicates operation cancellation, the controller 170 of the mobile terminal 100 may be configured to display the status bar 640 without the object 910.

Moreover, upon cancelling the second operation, the controller 170 of the mobile terminal 100 may successively cancel the first operation.

For example, in a state that the status bar 640 is displayed as illustrated in FIG. 9E, the controller 170 of the mobile terminal 100 may be configured to display the home screen 630 without the status bar 640 as illustrated in FIG. 9F. Accordingly, the mobile terminal 100 returns to an original operation state where there is no user's touch, thereby preventing malfunction caused by ghost touch.

In addition, upon canceling an operation caused by malfunction, when the mobile terminal 100 enters the underwater mode, the controller 170 of the mobile terminal 100 may control the mobile terminal 100 to display the home screen 920 of the underwater mode as illustrated in FIG. 9G In this manner, the mobile terminal 100, in a state that being submerged in water, may perform an operation appropriate for the underwater state.

Further, as illustrated in FIGS. 7 to 9G, in response to the determination of entering the underwater mode in a state that the first region touch signal to the third region touch signal are sequentially received from the touch panel 184, the controller 170 of the mobile terminal 100 may cancel operations performed based on the first region touch signal or the second region touch signal. Accordingly, when the mobile terminal 100 is submerged, malfunction may be prevented.

In response to the determination of entering the underwater mode in a state that the first region touch signal to the third region touch signal are sequentially received from the touch panel 184, the controller 170 of the mobile terminal 100 may control the mobile terminal 100 to enter the underwater mode and display the home screen of the underwater mode.

In response to the third region, where the third region touch signal is input, including the first region and the second region, and the first region touch signal to the third region touch signal being sequentially received within a predetermined period of time, the controller 170 of the mobile terminal 100 may determine that the mobile terminal 100 is in the underwater mode. As the mobile terminal 100 enters the underwater mode, the controller 170 of the mobile terminal 100 may cancel an operation, which has been performed regardless of a user's intention, thereby enhancing user convenience.

Further, in a state that the idle screen is displayed, in the case where the first region touch signal to the third region touch signal are sequentially received from the touch panel 184, the controller 170 of the mobile terminal 100 may perform an operation corresponding to any one item on the idle screen, and in response to the determination of entering the underwater mode, the controller 170 of the mobile terminal 100 may cancel the performed operation.

In addition, in a state that the home screen is displayed, in the case where the first region touch signal to the third region touch signal are sequentially received from the touch panel 184, the controller 170 of the mobile terminal 100 may perform an operation corresponding to any one item among a plurality of items on the home screen, and in response to the determination of entering the underwater mode, the controller 170 of the mobile terminal 100 may cancel the performed operation.

Figure 10:
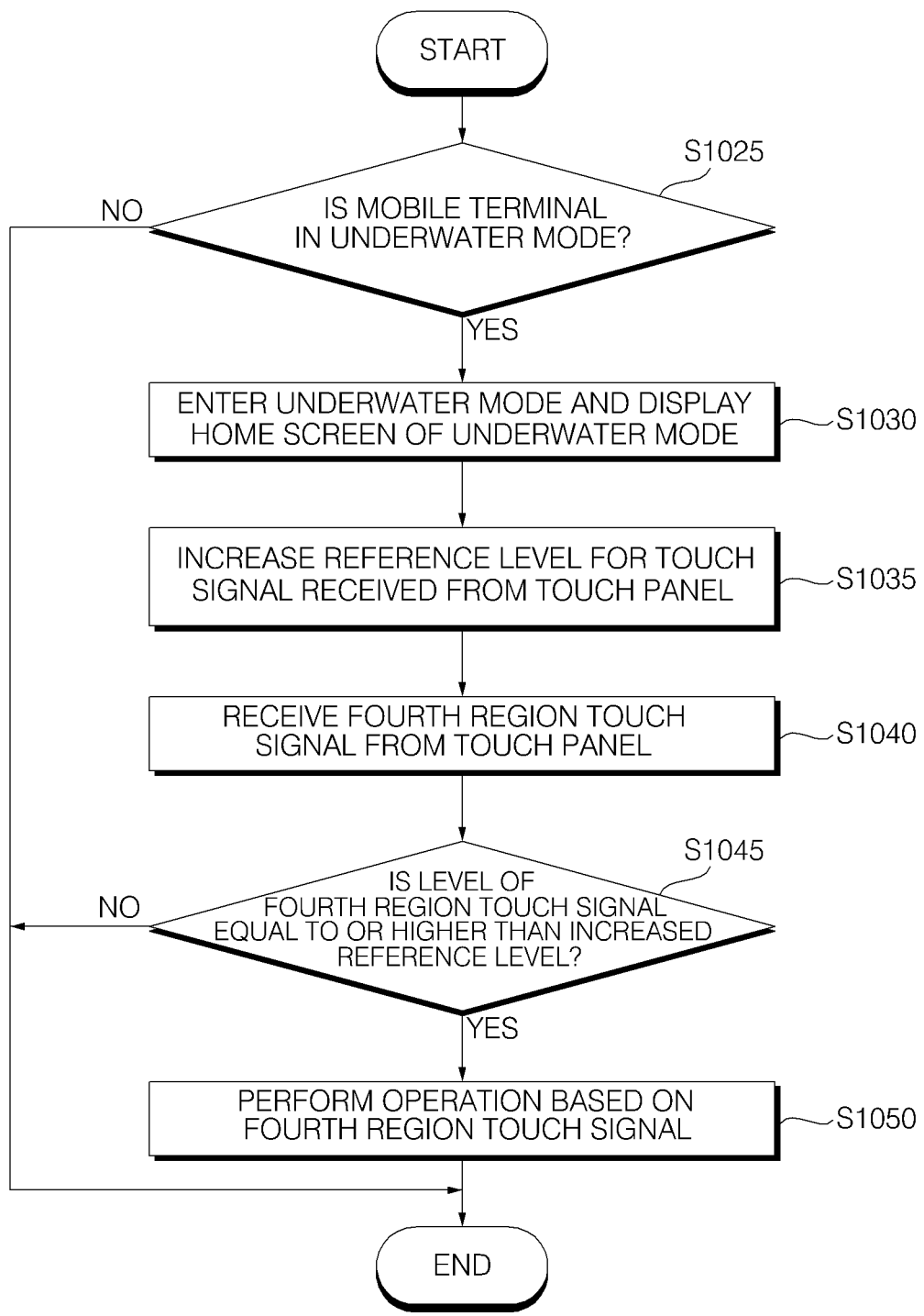
FIG. 10 is a flowchart illustrating a method of operating a mobile terminal according to another embodiment of the present invention.
Figure 11A:
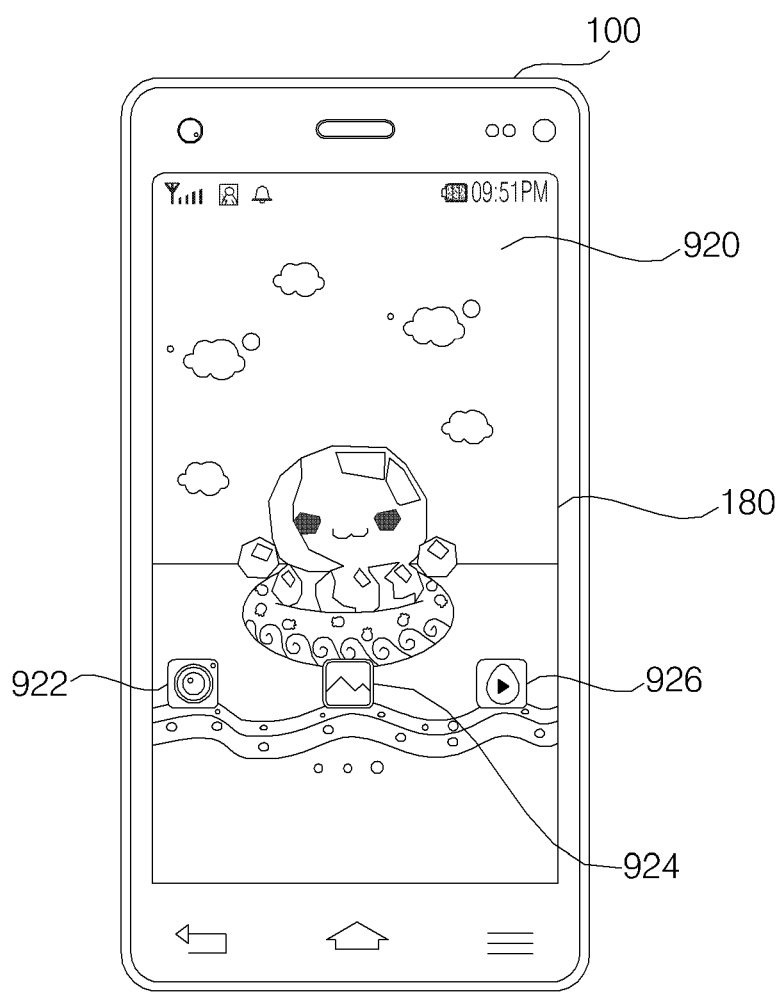
FIGS. 11A to 11C are diagrams referred to in the description of the method of operating the mobile terminal illustrated in FIG. 10.
Figure 11B:
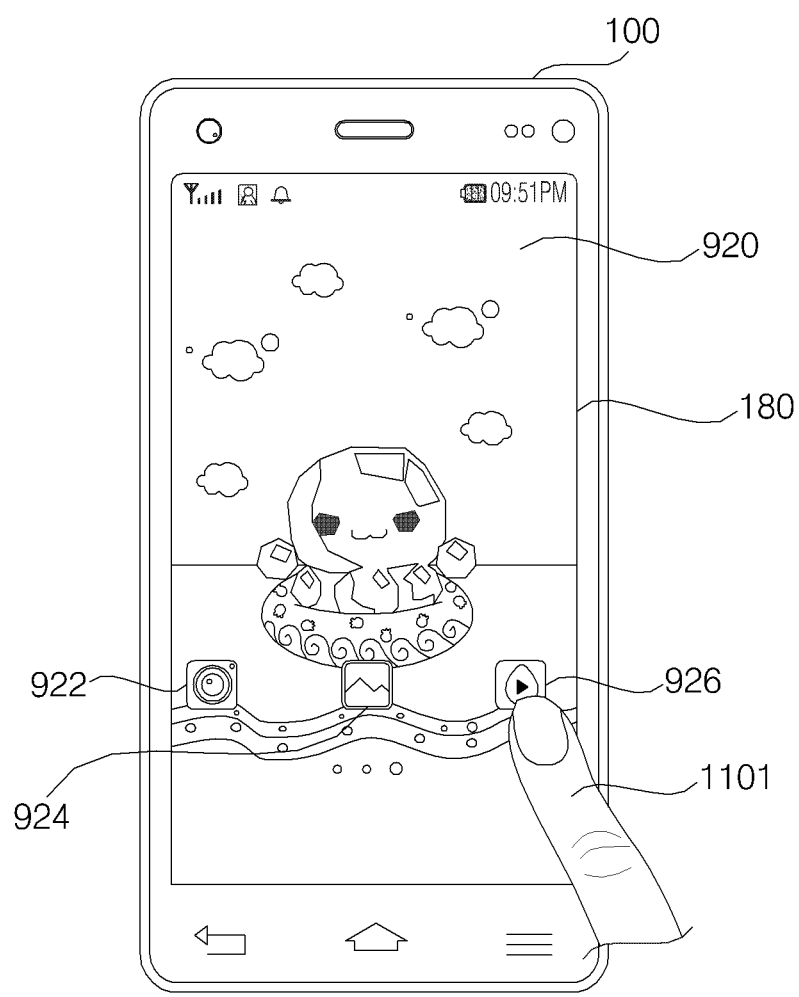
Figure 11C:
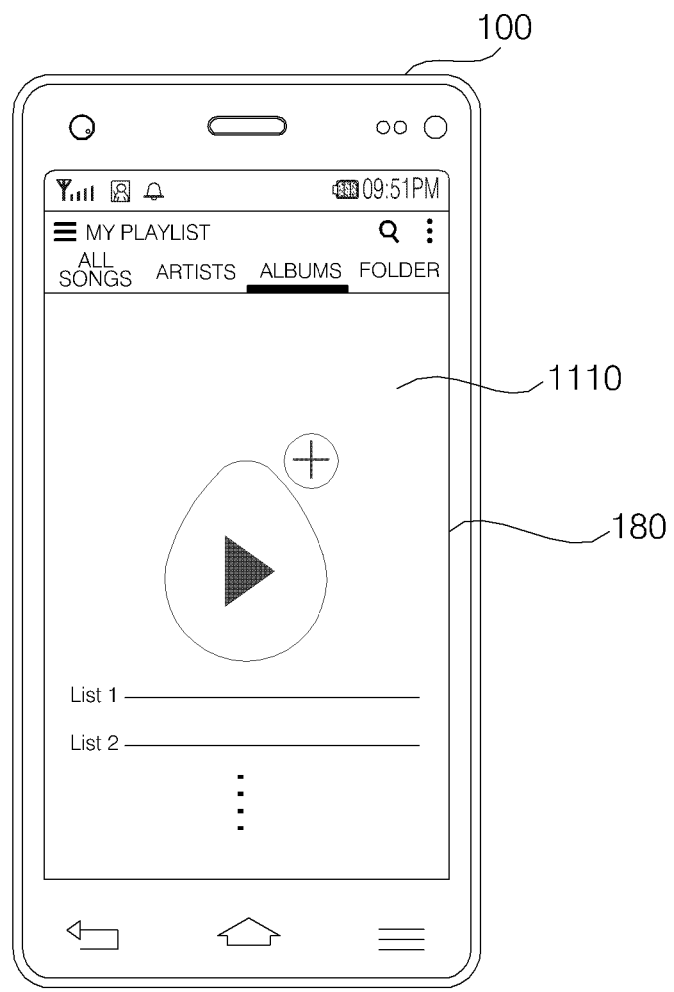

FIG. 10 is a flowchart illustrating a method of operating a mobile terminal according to another embodiment of the present invention, and FIGS. 11A to 11C are diagrams referred to in the description of the method of operating the mobile terminal illustrated in FIG. 10.

Referring to FIG. 10, the controller 170 of the mobile terminal 100 determines whether the mobile terminal 100 is in the underwater mode in S1025.

As described above, in the case where the first touch signal to the third region touch signal are sequentially received within a predetermined period of time, and the third region includes the second region and the first region, the controller 170 of the mobile terminal 100 determines that the mobile terminal 100 is submerged in water, and may control the mobile terminal 100 to enter the underwater mode.

Further, in addition to the determination whether the third region includes the second region and the first region, the controller 170 of the mobile terminal 100 may also determine whether the second region includes the first region.

That is, in the case where the mobile terminal 100 is sequentially submerged in the water 400 in the order of FIGS. 4A, 4B, and 4C, the controller 170 of the mobile terminal 100 determines that the mobile terminal 100 is submerged.

In addition, upon determining that the mobile terminal 100 is submerged, the controller 170 of the mobile terminal 100 may control the mobile terminal 100 to enter the underwater mode and display the home screen 920 of the underwater mode as illustrated in FIG. 9G in S1030.

Further, the controller 170 of the mobile terminal 100 may perform signal processing for underwater touch.

Specifically, the controller 170 of the mobile terminal 100 may increase a reference level of touch signals received from the touch panel 184 in S1035.

For sensing a touch input, touch signals are generally received, in which in the case where a touch signal, received from the touch panel 184, is at a level equal to or higher than a first reference level, the controller 170 of the mobile terminal 100 may determine that there is a touch input in a region of the touch signal.

In the case where the mobile terminal 100 is in the underwater mode, capacitance is increased due to the moisture on a front surface of the touch panel 184. Accordingly, as for underwater touch, the controller 170 of the mobile terminal 100 may determine, as touch input, only a touch signal which is at a level equal to or higher than a second reference level that is higher than the first reference level.

In a state that in the underwater mode, in response to receiving a fourth region touch signal from the touch panel 184 in S1040 after the reference level is increased, the controller 17 of the mobile terminal 100 determines in S1045 whether the fourth region touch signal is at a level equal to or higher than the increased reference level (equal to or higher than the second reference level), and in response to the fourth region touch signal being at a level equal to or higher than the increased reference level, the controller 170 of the mobile terminal 100 may perform an operation based on the fourth region touch signal in S1050.

FIG. 11A illustrates the home screen 920 of the underwater mode, which is displayed as the mobile terminal 100 enters the underwater mode.

Referring to FIG. 11A, the home screen 920 of the underwater mode includes an image representative of the underwater mode, and application items 922, 924, and 926 which may be executed in the underwater mode.

FIG. 11A illustrates a camera item 922, a gallery item 924, and a music item 926 as application items that may be executed in the underwater mode.

In a state that in the underwater mode, in the case where the music item 929 is selected by a user's touch with a finger 1101 as illustrated in FIG. 11B after the reference level is increased, the controller 170 of the mobile terminal 100 may execute the music playing application and display the music playing application screen 1110 as illustrated in FIG. 11C.

The controller 170 of the mobile terminal 100 may play and output music corresponding to an item selected by the user, such that music may be played even under water. Further, in the underwater mode, sound may be output with its volume being turned up louder than usual.

Accordingly, as illustrated in FIGS. 10 to 11C, a user's touch may be input even in the underwater mode, thereby enhancing user convenience.

Figure 12:
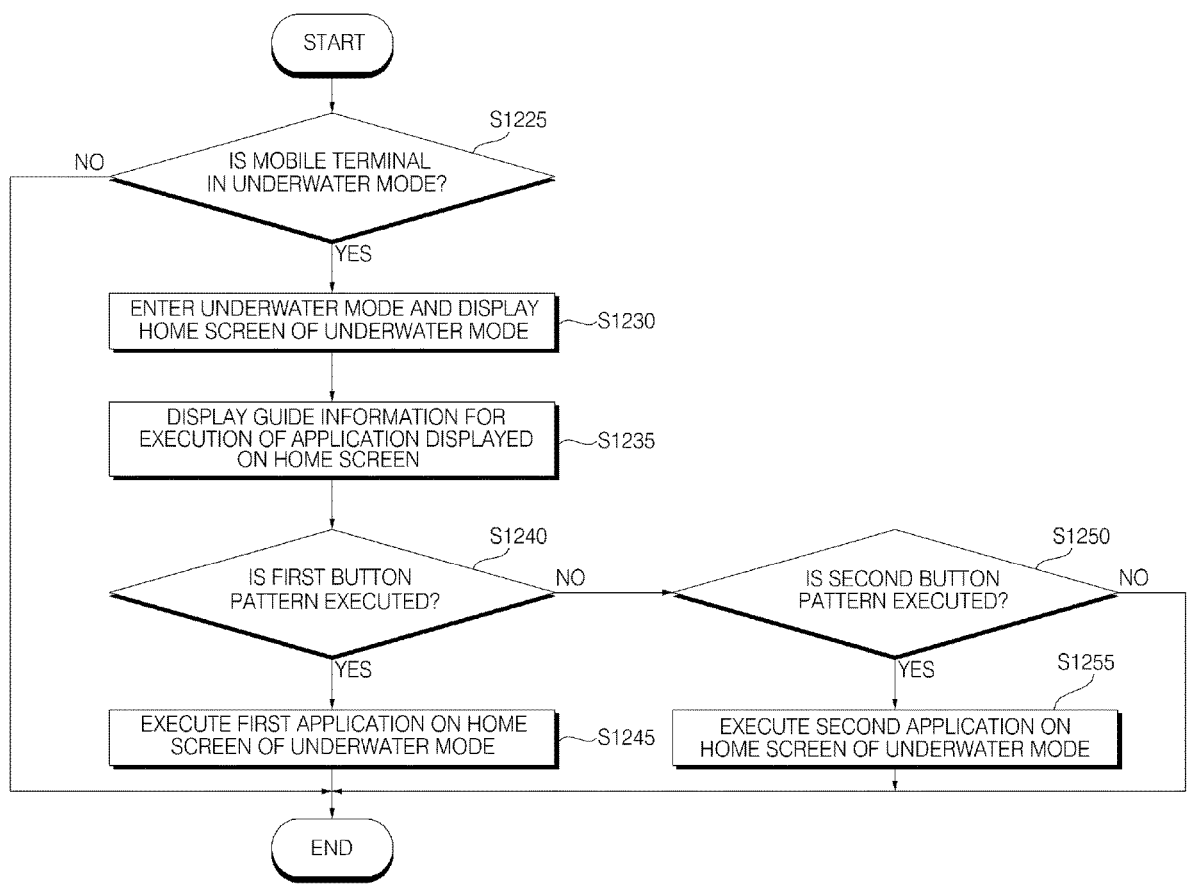
FIG. 12 is a flowchart illustrating a method of operating a mobile terminal according to yet another embodiment of the present invention.

FIG. 12 is a flowchart illustrating a method of operating a mobile terminal according to yet another embodiment of the present invention, and FIGS. 13A to 14G are diagrams referred to in the description of the method of operating the mobile terminal illustrated in FIG. 12.

Referring to FIG. 12, the controller 170 of the mobile terminal 100 determines whether the mobile terminal 100 is in the underwater mode in S1225.

As described above, in the case where the first touch signal to the third touch signal are received within a predetermined time, and the third region includes the first region and the second region, the controller 170 of the mobile terminal 100 determines that the mobile terminal 100 is submerged in water, and may control the mobile terminal 100 to enter the underwater mode.

Further, in addition to the determination whether the third region includes the second region and the first region, the controller 170 of the mobile terminal 100 may also determine whether the second region includes the first region.

That is, in the case where the mobile terminal 100 is sequentially submerged in the water 400 in the order of FIGS. 4A, 4B, and 4C, the controller 170 of the mobile terminal 100 determines that the mobile terminal 100 is under water.

In addition, when the controller 170 determines that the mobile terminal 100 is submerged in water, the controller 170 of the mobile terminal 100 controls the mobile terminal 100 to enter the underwater mode and display the home screen 920 of the underwater mode in S1230 as illustrated in FIG. 9G.

In addition to the underwater touch in the underwater mode, applications and the like may be executed by a combination of physical button operations.

To this end, the controller 170 of the mobile terminal 100 may be configured to display guide information for the execution of applications displayed on the home screen in S1235.

Here, the guide information may include button operation information.

Further, the controller 170 of the mobile terminal 100 may control the execution of applications of the mobile terminal 100.

Figure 13A:
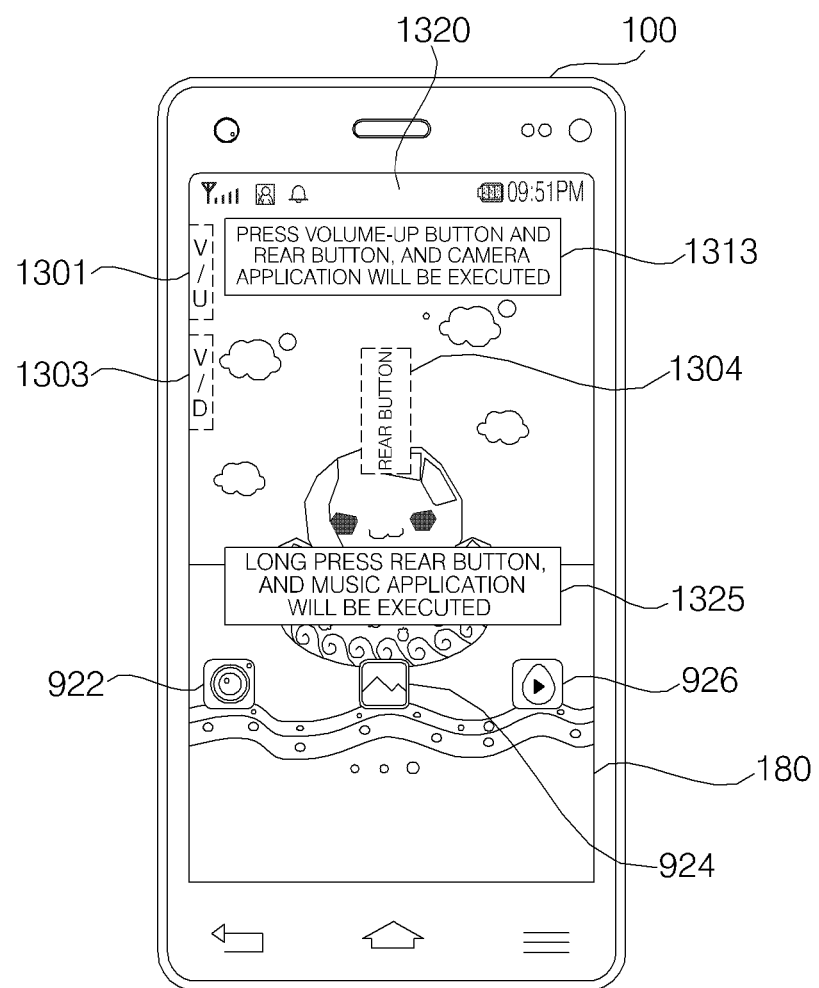
FIGS. 13A to 14G are diagrams referred to in the description of the method of operating the mobile terminal illustrated in FIG. 12.

FIG. 13A illustrates an example where in addition to the application items 922, 924, and 926 that may be executed in the underwater mode, an item 1301 indicating the position of a volume-up button, an item 1303 indicating the position of a volume-down button, and an item 1304 indicating the position of a physical button, particularly a rear button. The rear button may operates as a power button.

In order to guide the execution of the application items 922, 924, and 926, the controller 170 of the mobile terminal 100 may be configured to display first guide information 1313, second guide information 1325, and the like.

The first guide information 1313 is information for the execution of the first application item 922, and may be information including a combination of the volume-up button and the rear button as illustrated in FIG. 13A.

The second guide information 1325 is information for the execution of the third application item 926, and may be information indicating a long press of the rear button, as illustrated in FIG. 13A.

Figure 13B:
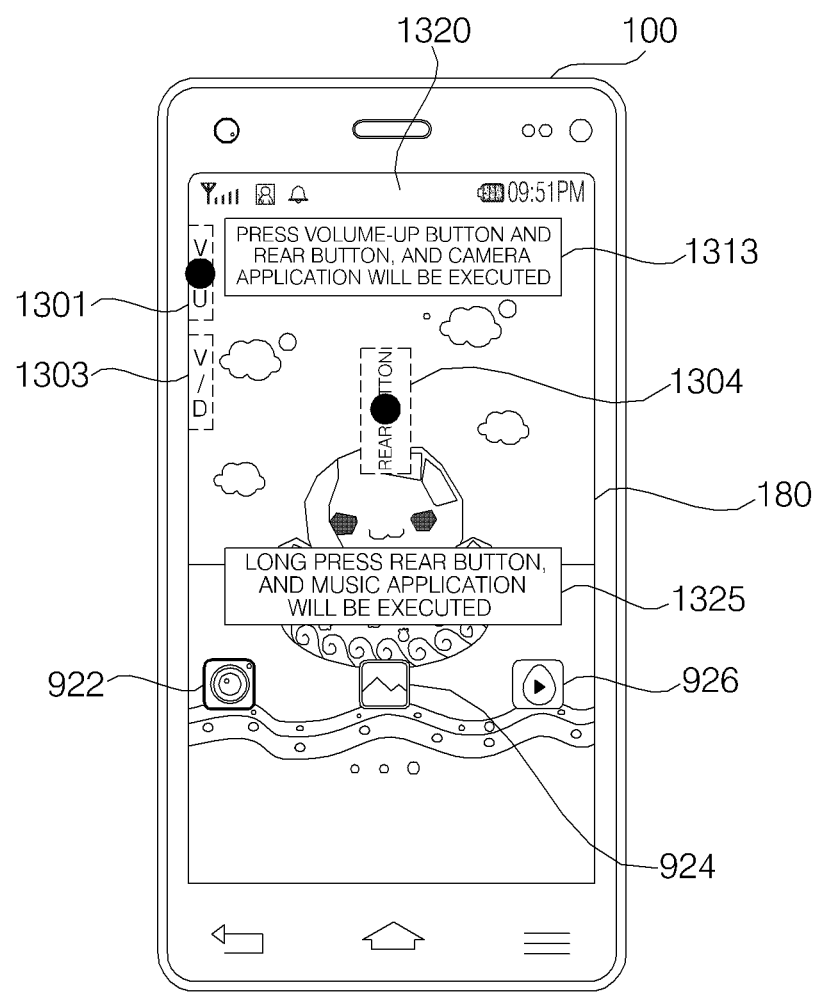
Figure 13C:
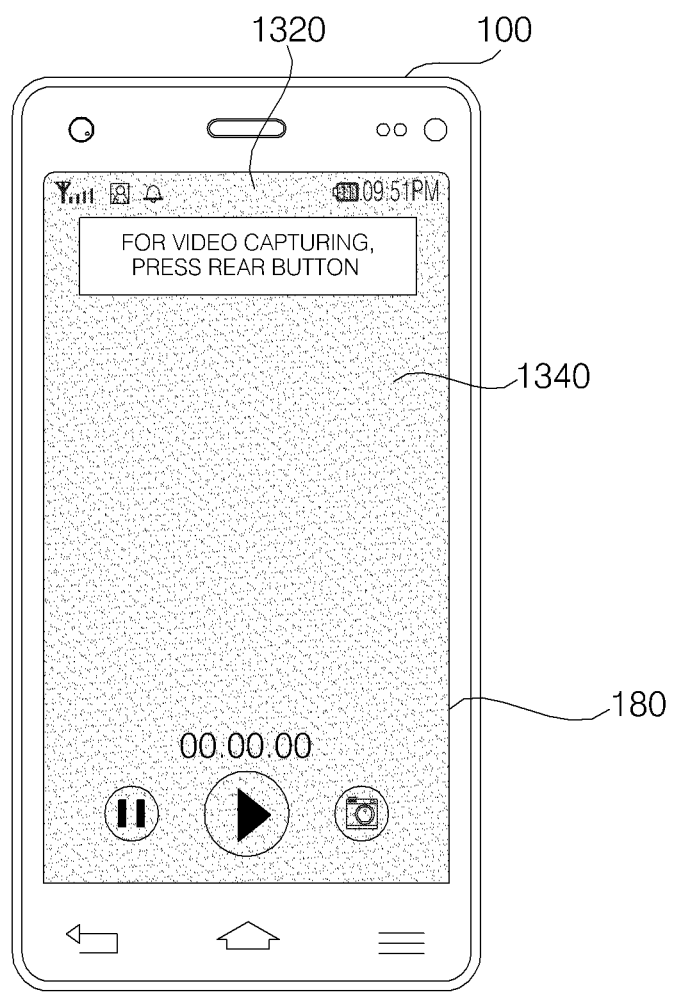

Based on the first guide information 1313, a user may operate under water the volume-up button and the rear button as illustrated in FIG. 13B, and in response to the button operation, the controller 170 of the mobile terminal 100 may execute the camera application, corresponding to the first application item 922, as illustrated in FIG. 13C.

Particularly, as the first application item 922 is selected, the controller 170 of the mobile terminal 100 may be configured to display a video capturing screen 134 as illustrated in FIG. 13C. Further, the controller 170 of the mobile terminal 100 may also display the guide information 1320 to start video capturing.

Accordingly, video may be captured when a user presses the rear button. In this manner, even in an underwater environment, a user may operate the mobile terminal 100, including execution of applications, by a physical button operation without touch, such that user convenience may be improved.

Figure 13D:
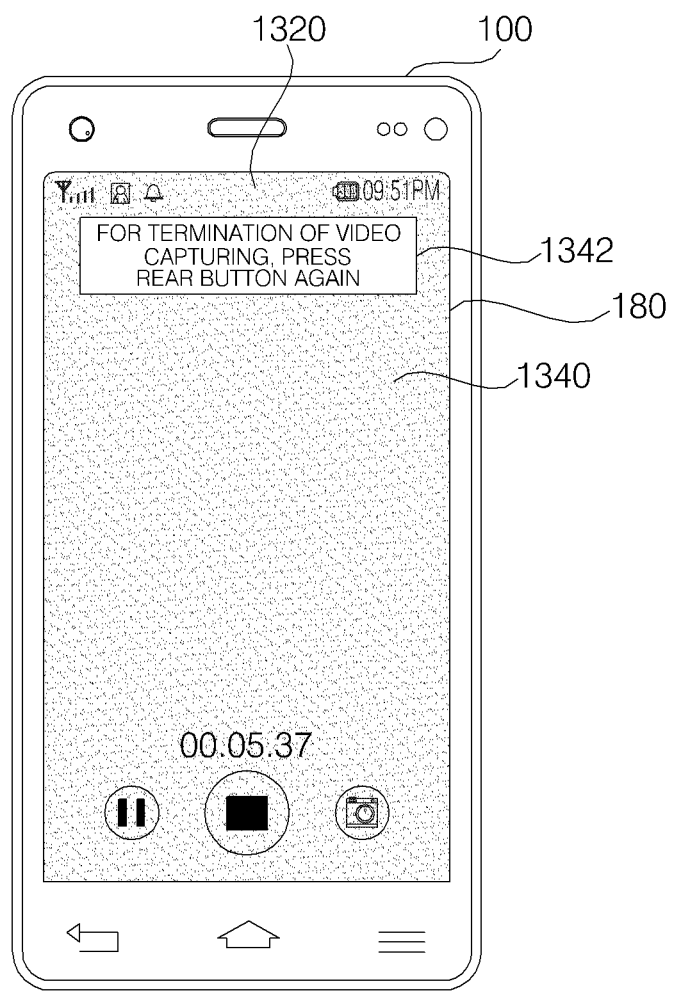

In the case where video is captured under water as illustrated in FIG. 13D, the controller 170 of the mobile terminal 100 may be configured to display the video capturing screen 1340 along with the guide information 1343 for termination of the video capturing.

Accordingly, when a user presses the rear button once again, the video capturing process may be terminated. In this manner, even in an underwater environment, a user may operate the mobile terminal 100, including execution of applications, by a physical button operation without touch, such that user convenience may be improved.

Figure 13E:
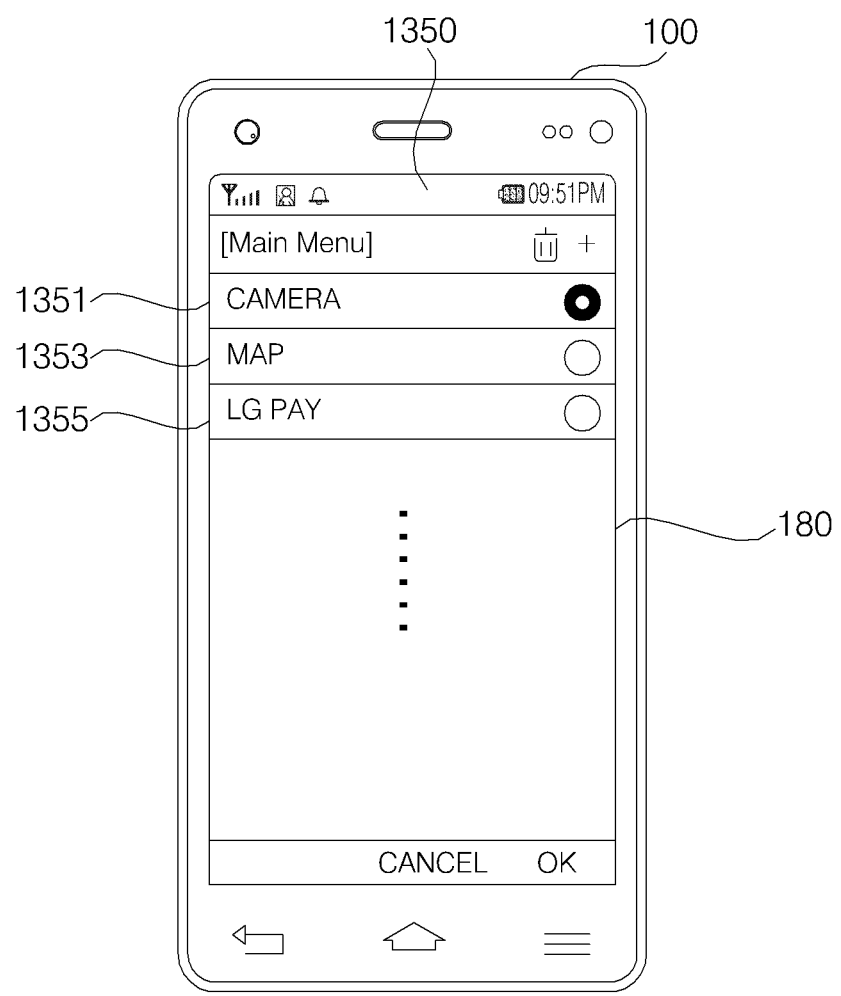

FIG. 13E illustrates a menu screen 1350 for the underwater mode.

Before entering the underwater mode, the menu screen may be displayed by a user's operation as illustrated in FIG. 13E.

The menu screen 135 may include a camera item 1351, a map item 1353, a payment item 1355, and the like.

Figure 13F:
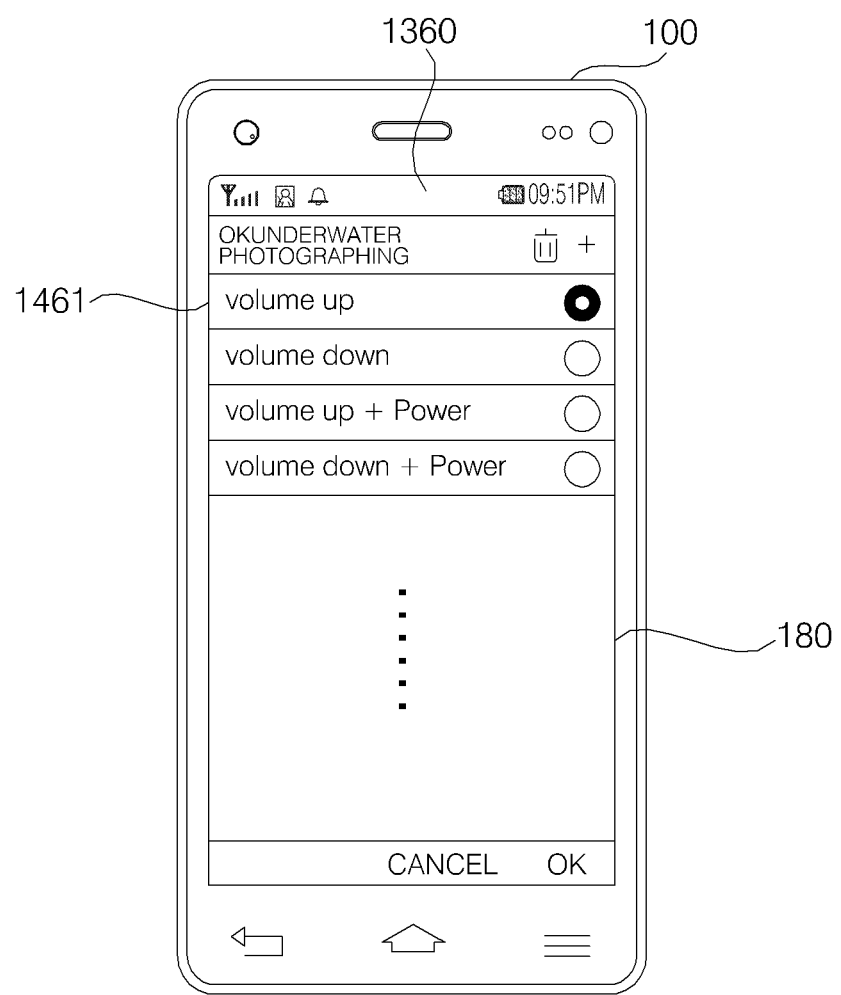

In the case where the camera item 1351 is selected from the items, the controller 170 of the mobile terminal 100 may be configured to display a setting screen 1360 for underwater photographing, which includes items to be set for the underwater mode, as illustrated in FIG. 13F.

FIG. 13F illustrates the setting screen 1360 for underwater photographing, which includes various items, such as a volume-up item 1461, a volume-down item, and the like.

In the case where the volume-up item 1461 is selected from the items, the controller 170 of the mobile terminal 100 may execute the volume-up item in a state that a video is captured under water by using a camera.

That is, in the case where the camera item is selected from the items on the home screen of the underwater mode, the controller 170 of the mobile terminal 100 may control the volume to be turned up louder during the video capturing process under water than the volume of the home screen before the underwater mode.

More specifically, the controller 170 of the mobile terminal 100 may enable video capturing by controlling the level of signals, collected by a microphone, to be increased in the underwater mode when compared to other modes.

Figure 14A:
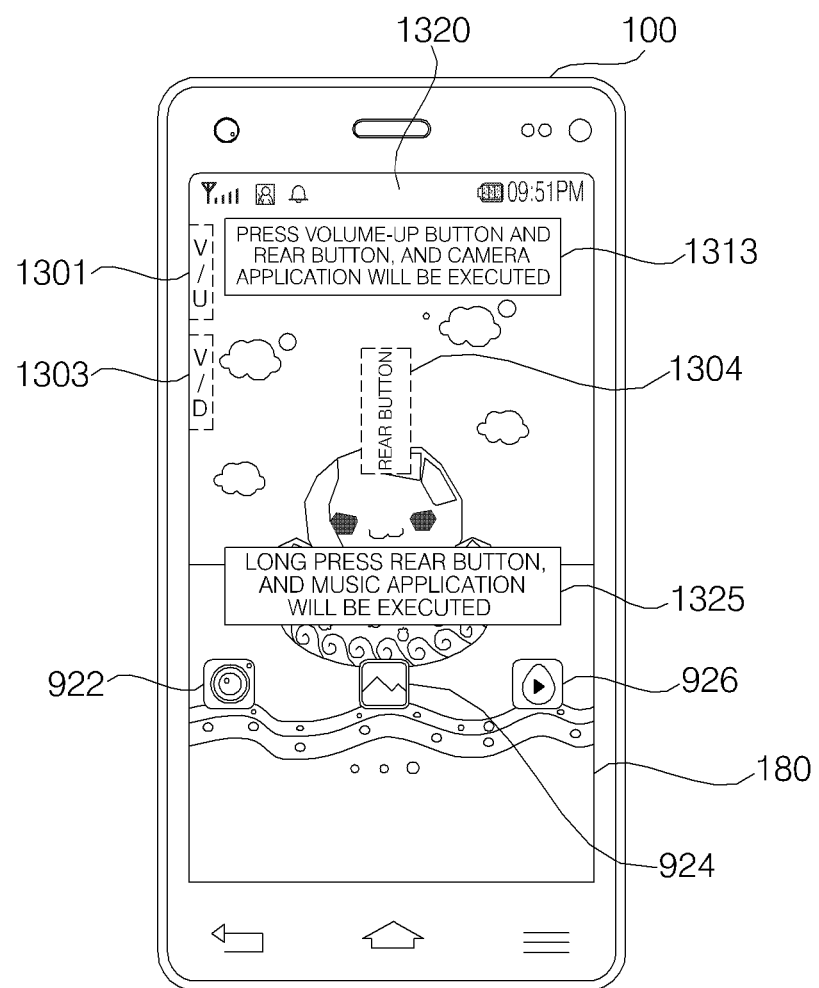

FIG. 14A illustrates guide information 1313 and guide information 1325 displayed on the home screen 1320 of the underwater mode.

Figure 14B:
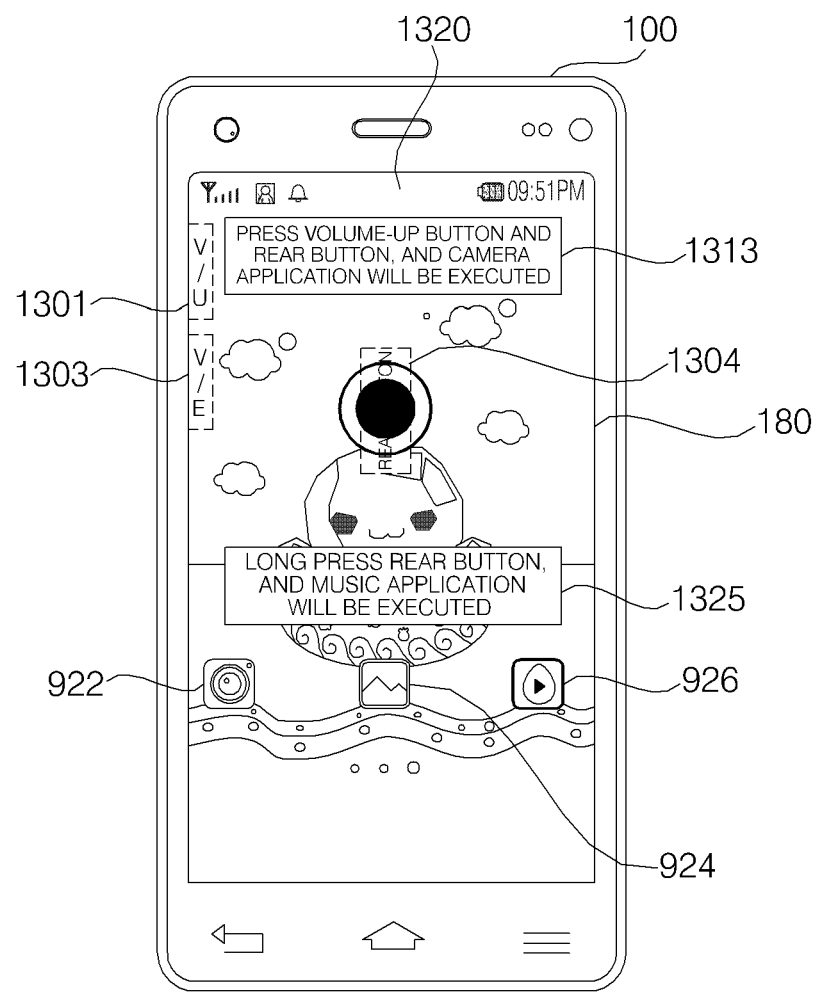
Figure 14C:
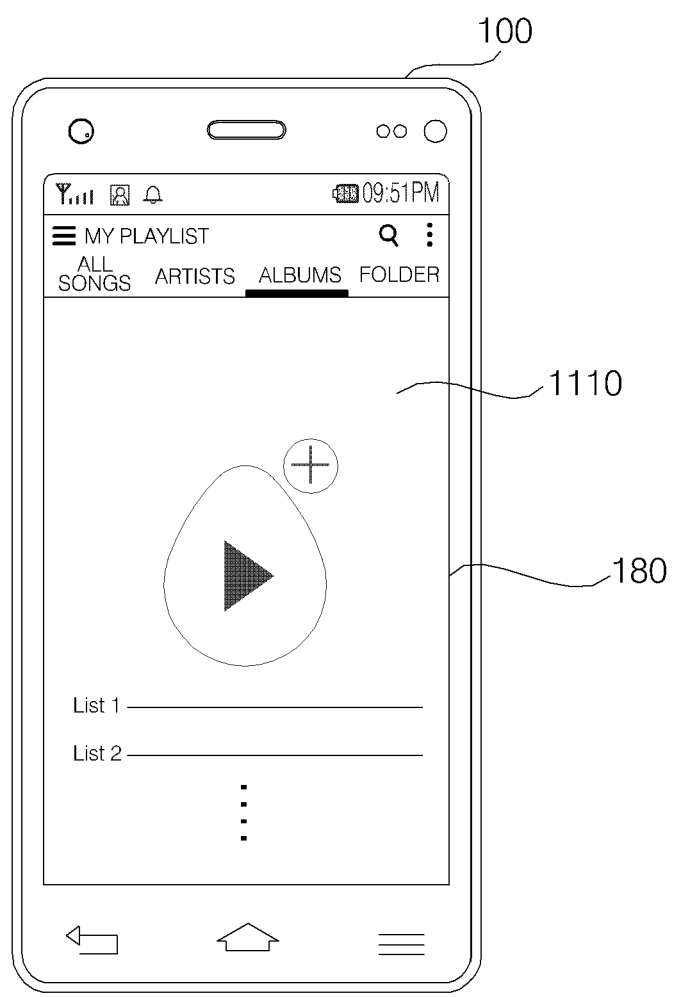

In the case where the rear button is long-pressed on the home screen 1320 of the underwater mode as illustrated in FIG. 14B, a music application corresponding to the third application item 926 may be executed as illustrated in FIG. 14C.

FIG. 14C illustrates the music playing application screen 1110, which allows music desired by a user to be played under water.

Figure 14D:
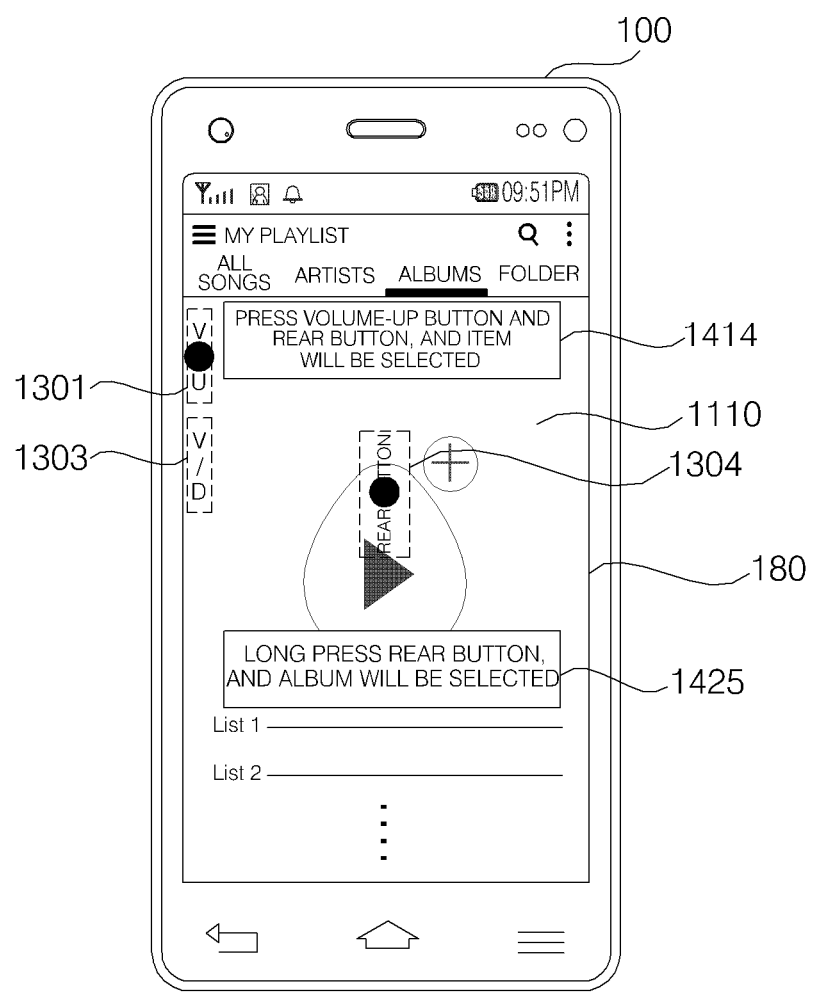
Figure 14E:
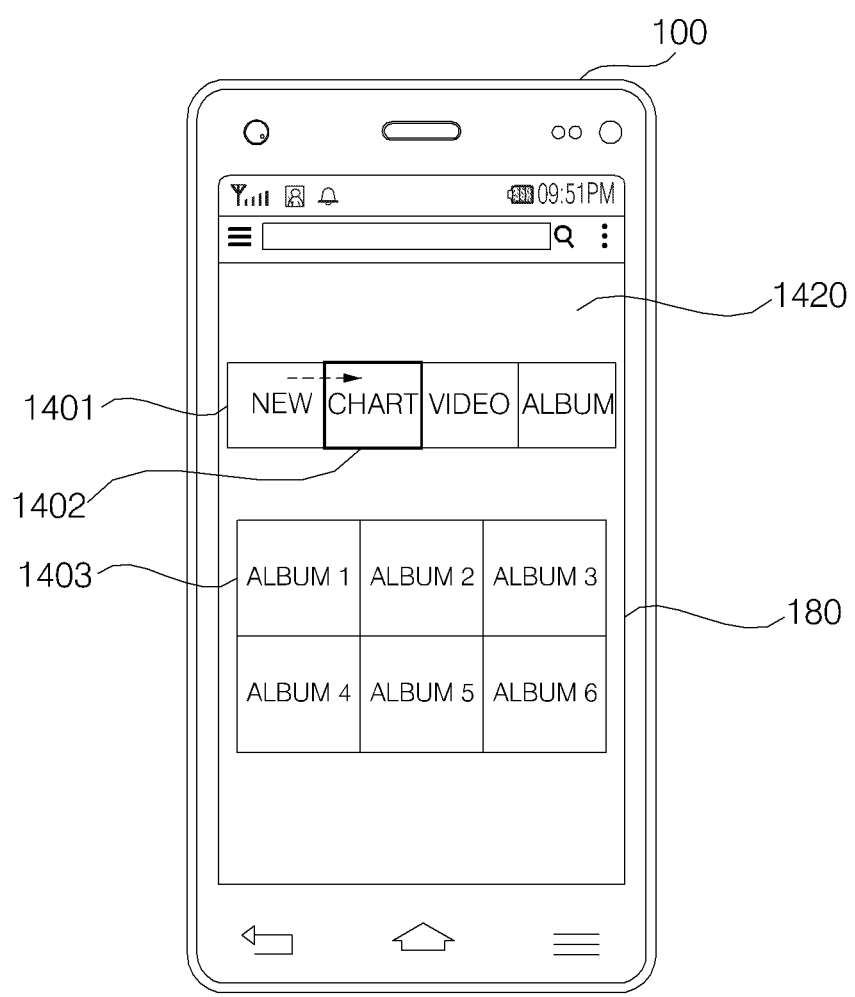

Further, as illustrated in FIG. 14D, guide information 1414 and guide information 1425 for playing music may be displayed on the music playing application screen 1110.

For example, the guide information 1414 may include information indicating focus movement between items by using the volume-up button and the rear button.

The guide information 1425 may include album selection information by the long press of the rear button.

In the case where the volume-up button and the rear button are pressed as illustrated in FIG. 14D, focus moves between items on the music playing application screen 1420, moving from a "new" item to a "chart" item. In this manner, music may be played by a physical button.

Figure 14F:
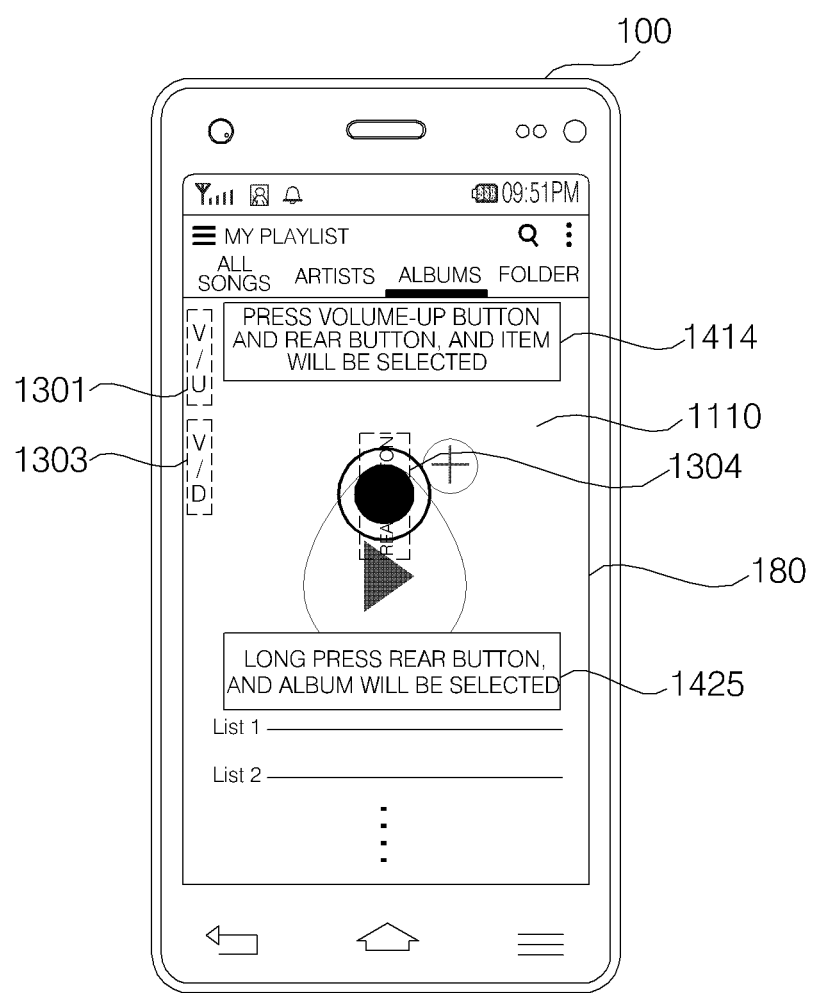
Figure 14G:
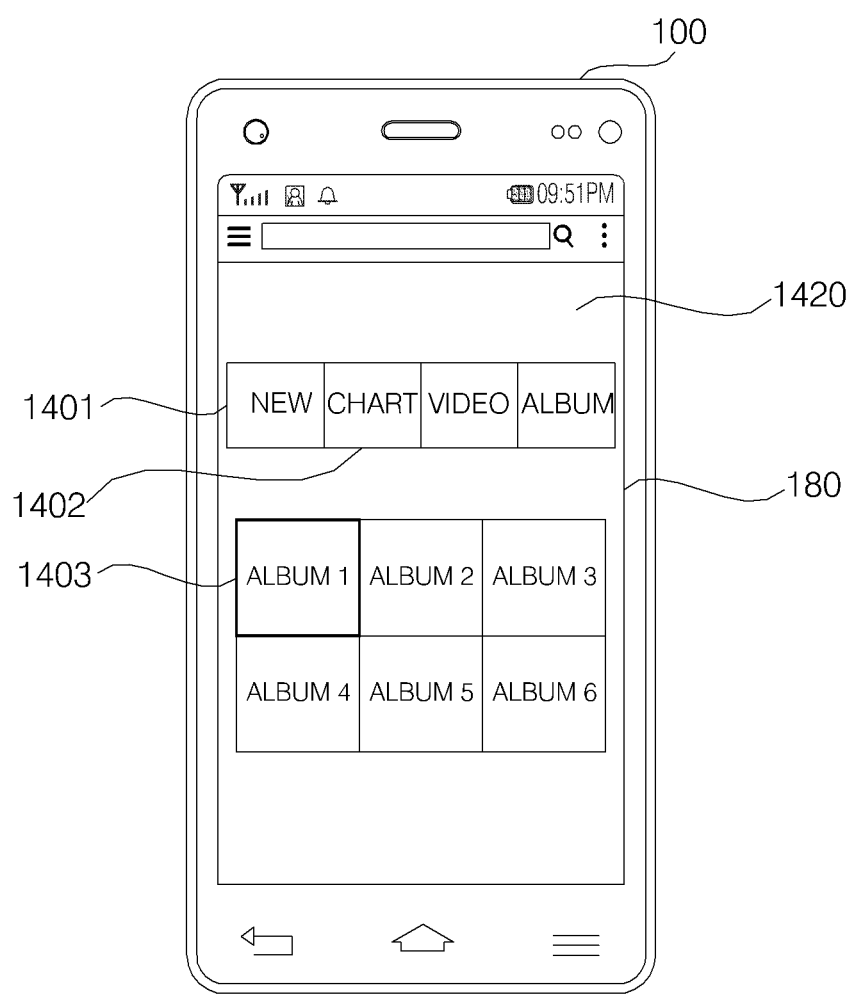

Further, in the case where the rear button is long-pressed as illustrated in FIG. 14F, a specific album item 1403 is selected and is in focus on the music playing application screen 1420. In this manner, music may be played by a physical button.

As apparent from the above description, a mobile terminal according to an embodiment of the present invention comprises a display including a display panel and a touch panel, and a controller, wherein in response to determination of entering an underwater mode in a state that a first region touch signal to a third region touch signal are sequentially received from the touch panel, the controller cancels an operation that has been performed based on the first region touch signal or the second region touch signal. In this manner, when the mobile terminal is submerged in water, malfunction may be prevented.

Particularly, in the case where the third region, having an input of the third region touch signal, includes the first region and the second region, and the first region touch signal to the third region touch signal are sequentially received within a predetermined period of time, the controller may determine that the mobile terminal is in an underwater mode, thereby enabling accurate determination of entering the underwater mode. Accordingly, as the mobile terminal enters the underwater mode, an operation, which has been performed regardless of a user's intention, may be cancelled, thereby enhancing user convenience.

In response to the determination of entering the underwater mode, the mobile terminal according to an embodiment of the present invention may enter the underwater mode and display a home screen of the underwater mode. In this manner, when the mobile terminal is submerged in water, the mobile terminal may perform an operation appropriate for an underwater state.

The mobile terminal according to another embodiment of the present invention comprises a display including a display pane and a touch panel, and a controller, wherein in response to determination of entering an underwater mode in a state that a first region touch signal to a third region touch signal are sequentially received from the touch panel, the controller controls the mobile terminal to enter the underwater mode and display a home screen of the underwater mode. In this manner, when the mobile terminal is submerged in water, the mobile terminal may perform an operation appropriate for an underwater state.

Particularly, the controller may control items displayed on the home screen of the underwater mode to be set differently from items displayed on a home screen before the underwater mode is initiated, such that an operation appropriate for the underwater state may be performed.

Further, when displaying the home screen of the underwater mode, the controller may control brightness of the home screen of the underwater mode or a size of the plurality of items displayed on the home screen of the underwater mode to be greater than brightness of the home screen before the underwater mode or a size of items displayed on the home screen before the underwater mode. In this manner, the mobile terminal may perform an operation appropriate for an underwater state.

In addition, in response to a camera item being selected from the plurality of items on the home screen of the underwater mode, the controller may control a volume to be turned up louder during a video capturing process than a volume of the home screen before the underwater mode, thereby enabling user convenience.

The mobile terminal according to yet another embodiment of the present invention comprises a display including a display pane and a touch panel, and a controller, wherein in response to determination of entering an underwater mode in a state that a first region touch signal to a third region touch signal are sequentially received from the touch panel, the controller increases a reference level for touch signals received from the touch panel. In this manner, when the mobile terminal is submerged in water, the mobile terminal may perform an operation appropriate for an underwater state.

Particularly, in a state that the home screen of the underwater mode is displayed, in response to receiving a fourth region touch signal from the touch panel after increasing a reference level for touch signals received from the touch panel, the controller may perform an operation corresponding to the fourth region touch signal in response to a level of the fourth region touch signal being equal to or higher than the increased reference level. Accordingly, even in the underwater mode, an operation may be performed by touch actions, thereby enhancing user convenience.

As described above, the mobile terminal according to the present invention is not limited to the configuration and method of the above-described embodiments, and all or some of the above embodiments may be selectively combined with each other to enable various modifications thereof.

The operation methods of the mobile terminal according to the present invention may be implemented as processor-readable code that can be written on a processor-readable recording medium included in the mobile terminal. The processor-readable recording medium may be any type of recording device in which data is stored in a processor-readable manner. Examples of the processor-readable recording medium include a Read-Only Memory (ROM), a Random-Access Memory (RAM), a Compact Disk Read Only Memory (CD-ROM), a magnetic tape, a floppy disk, an optical data storage device, etc. In addition, the processor-readable recording medium may be a carrier wave, e.g., data transmission over the Internet. In addition, the processor-readable recording medium can be distributed over a plurality of computer systems connected to a network such that processor-readable code is written thereto and executed therefrom in a distribution manner.

It will be apparent that, although the preferred embodiments have been shown and described above, the present invention is not limited to the above-described specific embodiments, and various modifications and variations can be made by those skilled in the art without departing from the gist of the appended claims. Thus, it is intended that the modifications and variations should not be understood independently of the technical spirit or prospect of the present invention.

What is claimed is:

1. A mobile terminal, comprising:
a display comprising a display panel and a touch panel; and
a controller configured to:
execute a first operation;
determine an underwater mode in response to receiving of sequential input to a first region, a second region, and a third region, of the touch panel, wherein the second region includes the first region, and the third region includes the second region and the first region;
terminate the executing of the first operation after the determining of the underwater mode, and
increase a reference level for touch input received at the touch panel to cause execution of an operation, after the determining of the underwater mode.

2. The mobile terminal according to claim 1, wherein the controller is further configured to:
determine the underwater mode in response to the receiving of sequential input occurring within a defined time period.

3. The mobile terminal according to claim 1, wherein the controller is further configured to:
cause the display to display an idle screen;
execute a second operation for at least one item displayed on the idle screen; and
terminate the second operation in response to the determining of the underwater mode.

4. The mobile terminal according to claim 1, wherein the controller is further configured to:
cause the display to display a home screen;
execute a second operation for one of a plurality of items displayed on the home screen; and
terminate the second operation in response to the determining of the underwater mode.

5. The mobile terminal according to claim 1, further comprising a communication unit configured to communicate data with an external device, and wherein the controller is further configured to:
terminate operation of the communication unit in response to the determining of the underwater mode.

6. The mobile terminal according to claim 1, wherein the controller is further configured to:
cause the display to display a first home screen comprising a first plurality of items in response to the determining of the underwater mode.

7. The mobile terminal according to claim 6, wherein the controller is further configured to:
cause the display to display a second home screen comprising a second plurality of items prior to the determining of the underwater mode, wherein the displaying of the first plurality of items is different than the displaying of the second plurality of items.

8. The mobile terminal according to claim 7, wherein the controller is further configured to:
control brightness of the second home screen to be greater than brightness of the first home screen, or control size of the second plurality of items to be greater than size of the first plurality of items.

9. The mobile terminal according to claim 7, wherein the controller is further configured to:
execute an operation corresponding to an item selected from the first plurality of items.

10. The mobile terminal according to claim 7, wherein the controller is further configured to:
execute an operation corresponding to an item selected from the second plurality of items, in response to an input received at the touch panel that exceeds the increased reference level.

11. The mobile terminal according to claim 7, wherein the controller is further configured to:
cause the display to display guide information for execution of applications displayed on the second home screen, wherein the guide information includes button operation information.

12. The mobile terminal according to claim 11, wherein the controller is further configured to:
execute a first operation for one of the second plurality of items displayed on the second home screen in response to an input received with regard to a first button operation pattern; and
execute a second operation for one of the second plurality of items displayed on the second home screen in response to an input received with regard to a second button operation pattern.

13. The mobile terminal according to claim 7, further comprising:
a camera; and
a microphone, and wherein the controller is further configured to:
activate the camera in response to user input to one of the second plurality of items of the second home screen; and
capture audio via the microphone when the camera is activated during the underwater mode, wherein a level of the audio capture is greater than an audio capture level prior to the underwater mode.

14. The mobile terminal according to claim 7, further comprising:
a camera; and wherein the controller is further configured to:
cause the display to display a setting screen for underwater photographing, which includes items to be set for the underwater mode, in response to a camera item being selected from a menu screen that is displayed during the underwater mode.

15. A mobile terminal, comprising:
a display comprising a display panel and a touch panel; and
a controller configured to:
determine an underwater mode in response to receiving of sequential input to a first region, a second region, and a third region, of the touch panel, wherein the second region includes the first region, and the third region includes the second region and the first region;
cause the display to display a home screen in response to the determining of the underwater mode, and
increase a reference level for touch input received at the touch panel to cause execution of an operation, after the determining of the underwater mode.

16. The mobile terminal according to claim 15, wherein the controller is further configured to:
execute an operation corresponding to an item selected from a plurality of items of the home screen, in response to an input received at the touch panel that exceeds the increased reference level.

17. The mobile terminal according to claim 15, wherein the controller is further configured to:
cause the display to display guide information for execution of applications on the home screen, wherein the guide information includes button operation information.

18. The mobile terminal according to claim 17, wherein the controller is further configured to:
execute a first application for one of a plurality of items displayed on the home screen in response to an input received with regard to a first button operation pattern; and
execute a second application for one of the plurality of items displayed on the home screen in response to an input received with regard to a second button operation pattern.

19. A mobile terminal, comprising:
a display comprising a display panel and a touch panel; and
a controller configured to:
determine an underwater mode in response to receiving of sequential input to a first region, a second region, and a third region, of the touch panel, wherein the second region includes the first region, and the third region includes the second region and the first region; and
increase a reference level for touch input received at the touch panel to cause execution of an operation, after the determining of the underwater mode.

20. The mobile terminal according to claim 19, further comprising:
a camera; and
a microphone, and wherein the controller is further configured to:
activate the camera in response to user input to one of a plurality of items of a displayed home screen; and
capture audio via the microphone when the camera is activated during the underwater mode, wherein a level of the audio capture is greater than an audio capture level prior to the underwater mode.

* * * * *